US011925820B2

United States Patent
Mattila

(10) Patent No.: US 11,925,820 B2
(45) Date of Patent: Mar. 12, 2024

(54) TWO-WAY PROTECTIVE RESPIRATOR SYSTEM WITH POSITIVE AIR FLOW AGAINST AIRBORNE CONTAMINANT PARTICLES AND VAPOR COMPONENTS

(71) Applicant: Razor Edge Systems, Inc., Ely, MN (US)

(72) Inventor: Robert J. Mattila, Ely, MN (US)

(73) Assignee: Razor Edge Systems, Inc., Ely, MN (US)

( * ) Notice: Subject to any disclaimer, the term of this patent is extended or adjusted under 35 U.S.C. 154(b) by 539 days.

(21) Appl. No.: 17/206,464

(22) Filed: Mar. 19, 2021

(65) Prior Publication Data

US 2022/0387829 A1 Dec. 8, 2022

(51) Int. Cl.
*A62B 18/02* (2006.01)
*A41D 17/00* (2006.01)
(Continued)

(52) U.S. Cl.
CPC ............ *A62B 18/006* (2013.01); *A41D 17/00* (2013.01); *A62B 18/02* (2013.01); *A62B 18/025* (2013.01); *A62B 23/02* (2013.01)

(58) Field of Classification Search
CPC ........... A62B 17/04; A62B 7/10; A62B 9/003; A62B 23/02; A62B 18/006; A62B 18/02;
(Continued)

(56) References Cited

U.S. PATENT DOCUMENTS 4,019,508 A 4/1977 Der Estephanian et al.
4,455,687 A 6/1984 Johansson
(Continued)

FOREIGN PATENT DOCUMENTS

CN 212395637 U * 1/2021
ES 1216684 U * 8/2018
(Continued)

OTHER PUBLICATIONS

CN-212395637-U description translation accessed Nov. 1, 2023 (Year: 2023).*
(Continued)

*Primary Examiner* — Bradley H Philips
*Assistant Examiner* — Kira B Daher
(74) *Attorney, Agent, or Firm* — DeWitt LLP

(57) ABSTRACT

A portable two-way protective respirator system to be worn by a person that filters ambient air of harmful viruses, bacteria, and other airborne contaminant particles and vapor components for safe and fresh breathing by the wearer, while also removing any harmful viruses, bacteria, and other airborne contaminant particles and vapor components from the person's exhaled airstream before it is emitted to the surrounding community to protect other persons therein is provided according to the invention. The system comprises a respirator mask connected by a flexible hose to an air inflow blower fan unit containing filter media that produces an incoming airstream for a first chamber contained inside the respirator mask free of those harmful contaminant particles and vapor components. A gaiter made from finely woven cotton material extending from the bottom of the respirator mask defines a second chamber for a second (Continued)

airstream exhaled by the person to remove viruses and bacteria from that second airstream by a diffusion mechanism as it passes between the threads of the finely woven gaiter material. The two-way protective respirator system is comfortable for the person to wear, while being highly portable to accommodate a variety of work, educational, and lifestyle activities conducted within a group setting.

21 Claims, 24 Drawing Sheets

(51) Int. Cl.
*A62B 18/00* (2006.01)
*A62B 23/02* (2006.01)

(58) Field of Classification Search
CPC .... A62B 18/025; A41D 17/00; A41D 13/002; A41D 13/0025; A41D 13/0158; A41D 13/1218
See application file for complete search history.

(56) References Cited

U.S. PATENT DOCUMENTS

| | | | |
|---|---|---|---|
| 4,901,716 A | 2/1990 | Stackhouse et al. | |
| 5,009,225 A | 4/1991 | Vrabel | |
| 6,257,235 B1 | 7/2001 | Bowen | |
| 6,279,572 B1 | 8/2001 | Danisch et al. | |
| 6,711,748 B2 | 3/2004 | Paris et al. | |
| 6,837,239 B2 | 1/2005 | Beizndtsson et al. | |
| 6,983,745 B2 | 1/2006 | Tang et al. | |
| 7,419,526 B2 | 9/2008 | Greer et al. | |
| 7,658,891 B1 | 2/2010 | Barnes | |
| 9,248,248 B2 | 2/2016 | Virr et al. | |
| 10,786,691 B2 | 9/2020 | Kao et al. | |
| 2007/0101867 A1 | 5/2007 | Hunter et al. | |
| 2007/0163588 A1 | 7/2007 | Hebrank et al. | |
| 2010/0170514 A1 | 7/2010 | Omer-Cooper | |
| 2015/0027446 A1* | 1/2015 | Brega | A62B 18/02 128/206.16 |
| 2016/0243383 A1 | 8/2016 | Yazdi et al. | |
| 2017/0189727 A1 | 7/2017 | Hunter et al. | |

FOREIGN PATENT DOCUMENTS

| | | |
|---|---|---|
| KR | 101821595 | 1/2018 |
| WO | 2018183872 | 10/2018 |
| WO | 2020013907 | 1/2020 |

OTHER PUBLICATIONS

ES-1216684-U description translation accessed Nov. 1, 2023 (Year: 2023).*

Gaiters do no harm: WVU toxicologists find coverings help contain the spread of exhaled droplets, Aug. 14, 2020, WVUTODAY (Year: 2020).*

Lyu, Wei and Wehby, George L., "Community Use of Face Masks and COVID-19: Evidence From a Natural Experiment of State Mandates in the US," Health Affairs, Aug. 2020, pp. 1419-1425.

Bollinger, Nancy J. and Schutz, Robert H., "A NIOSH Technical Guide...NIOSH Guide to Industrial Respiratory Protection, U.S. Dept. of Health and Human Services," Sep. 1, 1987, Publications Dissemination, DSDTT, National Institute for Occupational Safety and Health, Cincinnati, OH.

Konda, Abhiteja, et al., "Aerosol Filtration Efficiency of Common Fabrics Used in Respiratory Cloth Masks", ACS NANO 2020, 14, 6339-6347, ACS Publications, American Chemical Society, Apr. 24, 2020.

* cited by examiner

TWO-WAY PROTECTIVE RESPIRATOR SYSTEM WITH POSITIVE AIR FLOW AGAINST AIRBORNE CONTAMINANT PARTICLES AND VAPOR COMPONENTS

FIELD OF INVENTION

This invention relates to the protection of persons from airborne contaminants, and more specifically to face masks that protect the wearer from airborne microorganisms and other hazardous particles and vapors, while simultaneously safeguarding persons in the surrounding community space from viruses, bacteria, and other microorganisms exhaled by the wearer.

BACKGROUND OF THE INVENTION

An average person inhales over 3,000 liters of air during an eight-hour period. Hard physical labor can increase that volume to 10,000 liters. People assume that air is pure and harmless because it looks clear. But this assumption overlooks a variety of microscopic microorganisms and chemical gaseous and particulate substances that may be lurking in that air.

Industrial work processes can produce solid dust particulates, aerosol mists, vapors, and gases from grinding, sanding, cutting, blasting, polishing, thermal, and laser processes, as well as chemical agents and emitted byproducts that vaporize and condense. Such substances become airborne and can injure not only factory workers, but also other persons in the immediate and surrounding work spaces and communities that breath the contaminated air. Such injuries can include minor irritations, coughing, shortness of breath, bronchitis, rhinitis, and asthma to such serious conditions as heart diseases and cancers.

Bacteria and viruses often contaminate air as well, causing airborne diseases. Such small particulates may become aerosolized and spread as droplets through the air over time and distance via people breathing, talking, coughing, sneezing, or engaging in other activities that generate spraying or aerosol particles. Such droplets are suspended in the air for long time periods and become inhaled by other persons. Moreover, larger droplets greater than five microns sink quickly onto hard surfaces like tables, counters, and door handles, infecting other persons via surface contact. Omnipresent viruses can cause diseases like the common cold, influenza, chickenpox, mumps, measles, whooping cough (pertussis), tuberculosis, diphtheria, and swine flu. More ominously, the SARS-COV-2 form of coronavirus has infected millions of persons worldwide in 2020-2021 via airborne transmission to cause the COVID-19 disease that has led to hundreds of thousands of deaths in the United States alone. Even without deaths, airborne diseases often produce a variety of symptoms in humans, including inflammation of the nose, throat, sinuses, or lungs; coughing; sneezing; congestion; runny nose; sore throat; swollen glands; headaches; body aches; loss of appetite; fever; and fatigue.

In order to reduce the likelihood of contracting such diseases and reducing the spread within communities, doctors commonly stress the adoption of such preventative measures as avoiding close contact with infected persons, staying home when sick or vulnerable to the illness, wearing masks to prevent the spread of germs, covering one's mouth or nose while coughing or sneezing, frequent hand washing, and avoiding the touching of one's face with unwashed hands to minimize surface-contact transmission. Some diseases like chickenpox, diphtheria, measles, mumps, tuberculosis, and whooping cough are the subject of vaccinations, and COVID-19 vaccines have been under urgent development and several have recently been approved by governments for administration to patients. However, given their limited supply, it will take a while to inoculate a sufficient number of persons in the population with such vaccines to achieve herd immunity against the COVID-19 virus, and variants of the virus are appearing that may require a modified vaccine.

Moreover, some diseases like COVID-19 have been found to be socially transmitted by asymptomatic persons who are not apparently ill and have no way of knowing that they are infected. Persons over age 65 or exhibiting underlying medical conditions, including compromised immune systems, find themselves particularly at risk of infection, hospitalization, and death.

More specifically, it is often impractical for people to isolate themselves from other persons in order to avoid the contraction of airborne diseases as health policy experts have constantly demanded. Doctors emphasize the maintenance of six-foot "social distances" between individuals in order to minimize transmission. But such social distancing can be difficult to achieve and enforce within work and school environments where space is limited and workers and students need to co-exist in close proximity.

Even more problematic, this six-foot distance advocated by health policy experts assumes the prevalence of large viral droplets that fall onto surfaces without becoming airborne. If people stay at least six feet apart, then they will not come into surface contact with those fallen droplets emitted by another person. However, many, if not most, viruses including SARS-COV-2 are contained in small droplets, with a substantial portion of those droplets being submicron (e.g., <1 micron) in size that become readily airborne and can therefore travel more than six feet in distance and they can stay airborne indefinitely. Thus, a six-foot distance provides only a partial safety measure against viral spreads.

The reality is that viruses exist within droplets across a continuum of droplet sizes and the important role of the exhaled air and air currents that carry them. The only way to get rid of them is filtration or venting them into the atmosphere.

Thus, masks have been adopted as a ready barrier across a person's face against transmission or reception of airborne viruses and bacteria via respiration in the deepest part of the lungs. But not all "masks" are created equal—particularly for filtering out small viral particulates below 0.5 microns (500 nm) in size. Woven cotton masks having a moderate thread count (e.g., 80 TPI) may look attractive, but they may only produce a 5-55% efficiency for removing particles depending upon the particles' size. Scarfs or bandannas worn across a person's face reside very much at the bottom end of this efficiency range.

Meanwhile, high thread count (e.g., 120 TPI) cotton is clearly superior, exhibiting greater than 65% efficiency for filtering out<0.3 micron particles, and more than 90% efficiency for removing>0.3 micron particles. However, such finely woven fabrics are not commonly used for masks, in part because them may unduly impede breathing by the wearer.

Therefore, non-woven surgical masks are recommended by the healthcare industry. Such surgical masks are designed to keep operating rooms sterile by preventing germs from the nose or mouth of the wearer from contaminating the patient during surgery. They also act to help to block large-particle droplets, splashes, sprays, or splatters containing germs existing in the operating room from reaching the mouth and nose of the wearer.

However, these surgical masks have their limitations. First, they represent a loose-fitting, disposable device that leaves gaps between the mask and the wearer's face that frequently allow germs and other contaminants to pass through the resulting gaps. Second, although such surgical masks frequently comprise three or four layers of material with the two outside layers made from non-woven polypropylene, polystyrene, polycarbonate, polyethylene, or polyester strands that are spunbonded or melt blown into an extruded, randomly-oriented web for improved bacterial filtration and air permeability, the resulting gaps above 1 micron between the fibers contained in the non-woven fabric layers are typically too large to filter out virus particles that are usually much smaller. Virus particles are typically 30-100 nm in size existing in fluid droplets below one micron or less in size that are both respirable and can remain airborne indefinitely when exhaled. Compare this with bacteria particles that typically have a diameter less than 2.5 microns and dust and pollen that commonly exhibit diameters of 10 microns or less.

This inability to reliably entrap very small bacteria and virus particles is true even for Level 2 and Level 3 surgical masks approved by the United States Food and Drug Administration for protecting healthcare workers from low-to-moderate and heavy levels of exposure to aerosols, sprays, and fluids in the operating room. Even these extra-protective surgical masks, which are not commonly worn by the general population, offer at best 60% protection from germs. This may help to explain why cases of contagion by the COVID-19 virus spiked even in states in the U.S. where masks were worn by a very high percentage of the population. Indeed, the only directly comparative research study conducted to date (W. Lyn & G. Wehby, "Community Use of Face Masks and Covid-19: Evidence From a Natural Experiment of State Mandates in the US," *Health Affairs*, pp. 1419-25 (August 2020)) showed the surprising result that U.S. states instituting face mask mandates exhibited only a 2% reduction in Covid-19 cases compared with states without such mask mandates.

In the case of COVID-19, this unfortunate inability of the available surgical masks to slow the transmission of the disease has led to significant surges of positively infected persons and deaths. Government officials have responded by imposing severe restrictions upon their citizens that prevent gatherings of persons in an effort to slow COVID-19 transmissions. But, such "lock down" restrictions have simultaneously damaged economic, educational, familial, and religious activities, and increased mental illnesses. The unfortunate reality is that masks are never designed to protect the wearer—just the patient or another person from large particles exhaled by the wearer.

Therefore, the only product designed to specifically protect the wearer are respirators, and they are governed by the National Institute for Occupational Safety and Health ("NIOSH"), instead of the FDA. Such respirator devices are designed to achieve a very close facial fit for the wearer to produce very efficient filtration of airborne particles. The edges of N95, N99 and N100 respirators form a seal around the wearer's nose and mouth. In theory, if used properly, they will filter out at least 95% of infectious airborne particles. But, they are commonly used in healthcare settings, and the FDA has asked U.S. citizens not to wear them during the COVID-19 pandemic in order to save them for the medical community. Moreover, such N95 respirator masks can produce breathing problems and heat buildup experienced by the wearer due to the very reduced levels of air permeability that produce the reductions in viral transmissions. Consequently, even within the medical community, such N95 masks cannot be worn more than an hour or two without episodes of light-headedness and blackouts that impair cognitive functions. Some commercial N95 respirator masks therefore come equipped with exhalation valves to address these shortcomings, but such exhalation valves can diminish their ability to act as a barrier against passage of airborne particles.

Various more-sophisticated products have been developed by others within the industry to protect the wearer from airborne particles. For example, US. Published Application 2016/0243383 filed by Yazdi et al. discloses an unpowered respiratory hood and body suit that allows air in, along with a one-way valve or check valve that allows air to exit the hood. However, this reference does not discuss filters, so it is unclear how much protection is really provided to the wearer or persons in the surrounding community.

By contrast, U.S. Pat. No. 4,455,687 issued to Johansson discloses a helmet and face shield for a protective body suit used by workers in the sand blasting industry. A filter collar extending across the bottom of the helmet and around the head of the wearer restricts particles from entering the helmet to protect the wearer.

Other devices are designed to enhance circulation within the mask space for the benefit of the wearer. For example, U.S. Pat. No. 6,257,235 issued to Bowen shows a face mask having a filter body in front of the wearer's face sized to cover the nose and mouth. A fan unit helps to draw air into the mask or draw exhaled air out of the mask. It looks like the material of the mask, itself, serves as the filter. PCT Published Application WO 2020/013907 filed by Stenzler et al. illustrates a mask respirator having a sub-peak inspiratory flow blower. This air flow of the blower is greater than the peak inspiratory flow of the wearer, so that the wearer has adequate air to breath without inhaling unfiltered air.

U.S. Pat. No. 9,248,248 issued to Virr et al. discloses a respirator mask with a neck component that contains an air flow generator and a filter. This type of respirator is sleeker in profile and more comfortable to wear, while filtering incoming air. The patent does not discuss any filtration of exhaled air. U.S. Published Application 2007/0163588 filed by Hebrank et al. teaches a respirator with a mask and an air mover. An over supply of air delivered to the mask pushes out the exhaled air. UV light generated by a mercury vapor lamp filters the incoming air. However, none of these mask or respirator devices serve to remove airborne contaminants from air exhaled by the wearer which might harm people in the surrounding space or community.

By contrast, U.S. Pat. No. 6,279,572 issued to Danisch et al. discloses a face shield with an associated blower unit and an inlet air filter. An exit filter seal around the face shield prevents unfiltered air from entering the breathing chamber. The patent mentions a "filter cowl" (60) otherwise not shown in the published application document that might act as an outlet filter element. But see U.S. Published Application 2010/0170514 filed by Omer-Cooper which illustrates a mask worn by sleep apnea patients. Breathable, pressurized gas is delivered to the mask, and an outlet filter for exhaled air is included.

Meanwhile, the medical profession has created demand for a long time for masks that protect patients from viruses and bacteria exhaled by their surgeons and other medical professionals. Manufacturers of products like computer chips likewise need to protect their surrounding clean rooms. The simple face mask is one example. More elaborate examples include U.S. Pat. No. 4,901,716 issued to Stackhouse et al. that discloses a hood and face shield having an air inlet and outlet port. A flapper valve normally uncovers the port to allow air in for breathing. But when the wearer coughs or sneezes, the differential pressure across the flapper valve causes it to close the port to prevent the contaminated air from exiting the hood. See also U.S. Pat. No. 4,019,508 issued to Der Estephanian et al. that shows a wearable, self-contained hood and vest combination for surgeons. Air exhaled by the surgeon is run through a filter unit before it is vented into the clean operating room.

U.S. Pat. No. 5,009,225 issued to Vrabel teaches a personal ventilating system for hoods and gowns worn by surgical team members. A DC-powered motor and blower pushes air into the hood and gown. A filter removes contaminants from the exhaled air in order to protect the patient. See also PCT Published Application WO 2018/183872 filed by McCoy et al. that discloses head gear containing a hood, mask, and face shield. Moisture barrier fabric covers the wearer's mouth inside the hood and directs exhaled air out through a breathable particle filtration fabric.

Some devices known within the industry can filter or otherwise clean both the inlet and exhaled air streams. For example, U.S. Pat. No. 6,983,745 issued to Tang et al. discloses an isolation suit used in a hospital operating room. A two-way air supply and disinfectant pump with a fan contained inside each through passage of the pump delivers air into the hood of the suit and draws exhaled air out of the hood. UV lights disinfect the air passing through both of these through passages. Korean Published Application KR101821595 filed by Hyuk Jin Yoon shows a mask having a first filter module for supplying filtered air into the interior of the mask. A second filter module filters exhaled air. U.S. Pat. No. 6,711,748 issued to Paris et al. discloses head gear worn by a surgeon that includes a fan for cooling the interior space between the face and the face shield, and a garment for resisting passage of liquids and aerosols. The patent mentions that both the surgeon and patient are "protected."

U.S. Pat. No. 10,786,691 issued to Kao et al. discloses a positive air pressurized respirator ("PAPR") of compact design. An impellor and filter contained inside the neck unit attached to the mask delivers pressurized, filtered air to the wearer. Exhaled air can be passed through a second filter unit to remove viruses and bacteria to protect the surrounding community. U.S. Pat. No. 7,419,526 issued to Greer et al. teaches conformal filter cartridge units that accommodate the curvature of the human face. They can be installed in a respirator that contains two separate filter units, one for inlet air and the other for exhaled air. U.S. Pat. No. 6,837,239 issued to Beizndtsson et al. discloses a ventilation system for a biohazard suit with a respirator. A filter removes contaminants from the inlet air. The patent mentions that a second filter unit could be added to the outlet air in case the wearer is operating inside a clean room.

While these prior art references may show the filtration of both incoming airflows and outgoing exhaled airflows for purposes of protecting both the wearer of the mask, hood, or respirator device and people in the surrounding community, they seem to rely upon external sources of breathable oxygen for the wearer, or elaborate filter units containing HEPA filters; combinations of activated carbon filters, prefilters, and HEPA filters; or UV light eradicators of microorganisms for removing contaminants from ambient air breathed by the wearer. Moreover, many of them also must contain complicated fan units for forcing air flow into the mask or hood space to cool it to make it bearable for the wearer. And many of these devices contain cumbersome hoods, suits, oxygen cylinders, hoses, and other equipment that make it very difficult for a person to perform a work task, let alone normal life activities, unless confined to a very small radius of mobility.

Thus, it would be highly beneficial to provide a portable respirator system that can be conveniently worn by a person for a prolonged time period to protect himself against airborne particles and vapor components while conducting work educational, or lifestyle activities within a group setting that provides filtered inlet air into a chamber surrounding the wearer's nose and mouth, while allowing easy exhalation by the wearer into a separate chamber that readily removes bacterial and viral contaminants from that exhaled airstream by diffusion without complicated filtration or microorganism eradication mechanisms before it becomes airborne. In this manner, the respirator system could protect both the wearer and people within the surrounding community from harmful airborne particles, vapor components, and diseases.

SUMMARY OF THE INVENTION

A portable two-way protective respirator system to be worn by a person that filters ambient air of harmful viruses, bacteria, and other airborne contaminant particles and vapor components for safe and fresh breathing by the wearer, while also removing any harmful viruses, bacteria, and other airborne contaminant particles from the person's exhaled airstream before it is emitted to the surrounding community to protect other persons therein is provided according to the invention. The system comprises a respirator mask connected by a flexible hose to an air inflow blower fan unit containing filter media. The air inflow blower fan unit produces a first airflow stream under a slightly positive pressure condition that is delivered to the respirator mask after the filter media like a HEPA filter or other electrostatic filtration or ultraviolet light means removes the harmful viruses, bacteria, and other airborne contaminant particles from the first airstream. This first airstream is delivered to a first chamber contained inside the respirator mask defined by the respirator mask and the face of the person. This first airstream can be readily and safely breathed by the person wearing the respirator mask.

Attached to the respirator mask and extending below it is a gaiter made from, e.g., finely woven cotton material. This gaiter and the person's chest against which the gaiter edges lie defines a second chamber. As the person exhales, the resulting second airstream passes into the first chamber and through one or more outlet orifices contained within the bottom wall of the respirator mask into the second chamber. The second airflow will pass through apertures between the threads of the finely woven gaiter fabric to remove any viruses or bacteria exhaled by the person into the second airstream via a diffusion mechanism, resulting in third persons within the surrounding community being free of harmful viruses and bacteria that the person wearing the respirator mask would otherwise contaminate them with. In this manner, the two-way protective respirator system of the present invention protects both the wearer from harmful viruses, bacterial and other airborne contaminant particles contained in the ambient air, and third persons within the surrounding community from viruses and bacteria that the person wearing the respirator mask might exhale.

The filtration media contained in the air intake blower fan unit may alternatively comprise a NATO filter cannister containing activated carbon or other suitable material for removing harmful vapor components from the ambient air. Alternatively, the filtration media may comprise a combination of such NATO filter cannister with, e.g., a HEPA filter, so that both harmful vapor components and harmful viruses, bacteria, and other airborne particles may be removed from the ambient air for the protection of the health of the person wearing the respirator mask.

The volume of the second chamber should be larger than the volume of the first chamber in order to reduce the velocity of the exhaled second airflow as it passes from the first chamber to the second chamber. This velocity reduction will cause the lateral edges of the gaiter to lie more securely against the person's chest in order to produce a more secure seal for the second chamber. This will reduce any outflow of the second airflow through any gaps between the gaiter and the person's chest, thereby better ensuring that the viruses and bacteria contained within the second airflow must pass instead through the apertures between the threads of the finely woven fabric of the gaiter for removal from the second airflow via the diffusion mechanism.

Proper sizing of the outlet orifice(s) contained in the bottom wall of the respirator mask will act to ensure better separation of the incoming filtered and fresh first airstream entering the first chamber from the exhaled second airstream, so that the exhaled second airstream may more readily pass into the second chamber. This improves the comfort of the respirator mask for the person.

At the same time, a portion of the second airstream contained inside the second chamber can be drawn by heavier breathing of the person back through the outlet orifice(s) into the first chamber to supplement the first airstream contained inside the first chamber for breathing by the person. This feature helps to meet the needs of the person undergoing exercise or other strenuous conditions without drawing ambient air that might contain harmful viruses, bacteria, other airborne contaminants, and vapor components through any gaps between the respirator mask and the person's face to satisfy the breathing needs of the person, as prior art masks will produce.

The two-way protective respirator system of the present invention may also feature a thermoelectric cooling/heating unit that enables the person to decrease or increase the temperature of the incoming airflow compared with the ambient air temperature for additional comfort for the person wearing the respirator mask. By reducing the temperature of the resulting filtered first airstream, the humidity level may also be adjusted for additional comfort.

The two-way protective respirator system of the present invention is comfortable for the person to wear, while being highly portable. Thus, the person can wear it while conducting a variety of work, educational, and lifestyle activities within a group setting. Depending upon the filtration media selected, the system can protect the person and other third persons within the surrounding community from a variety of viruses and bacterial contaminants that lead to a variety of diseases, including Covid-19.

DETAILED DESCRIPTION OF THE PREFERRED EMBODIMENT

Figure 1:
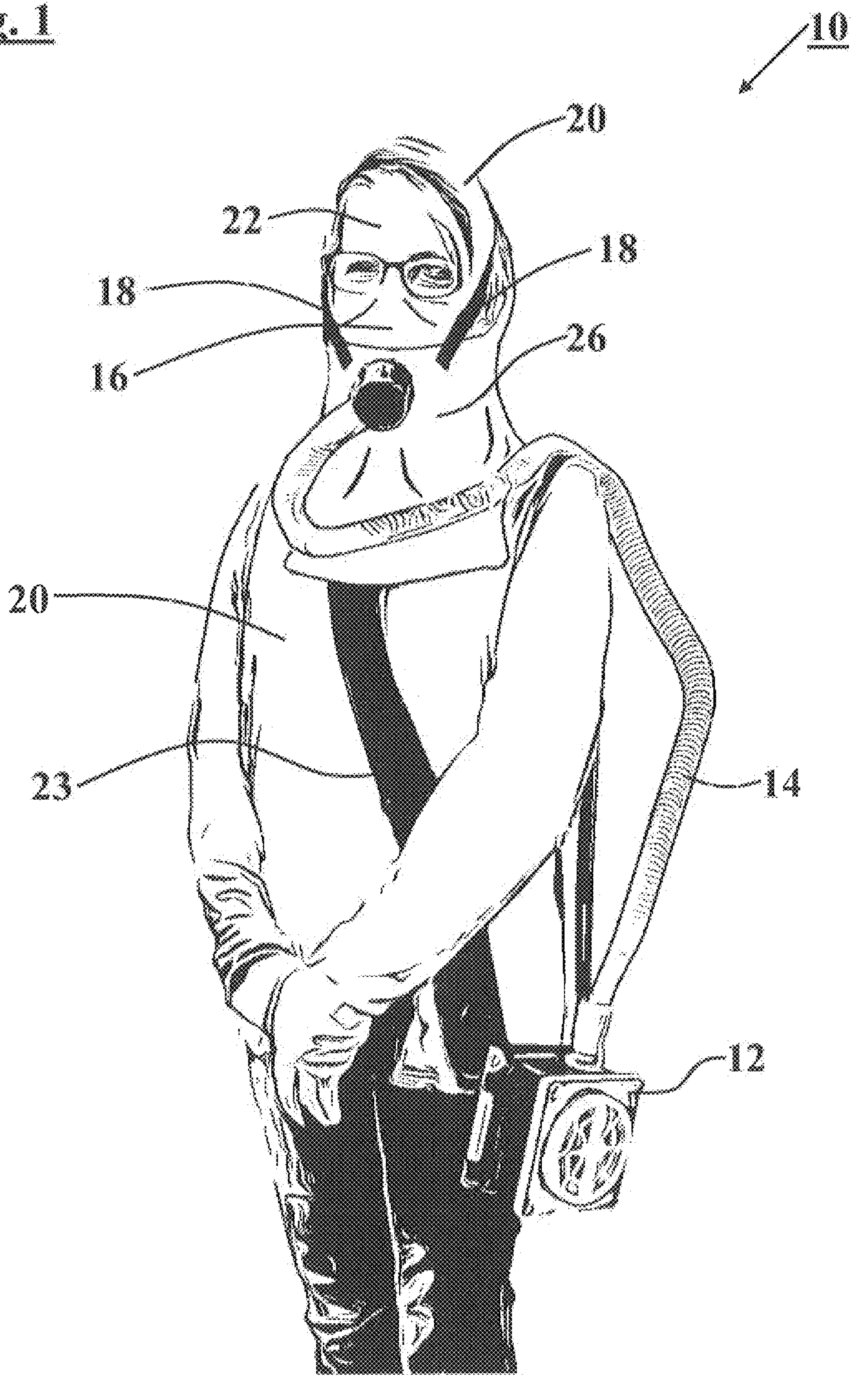
FIG. 1 is a frontal perspective view of a person wearing the shoulder strap embodiment of the two-way protective respirator system of the present invention.

A portable two-way protective respirator system to be worn by a person that provides inlet air to a first chamber contained in the respirator that is filtered of harmful viruses, bacteria, and other airborne contaminant particles and vapor components, for safe and fresh breathing for the wearer, and a second chamber off the first chamber that collects exhaled air from the wearer for separation of harmful viruses, bacteria, and other microorganisms contained therein by means of diffusion before they are transmitted to persons within the surrounding community is provided according to the invention. Such a portable mask system acts like a respirator to protect the wearer, while simultaneously serving as a mask to protect people within the surrounding community from harmful airborne contaminant particles, vapor components, and diseases. It also provides much-needed mobility to the person wearing the protective two-way protective respirator system for conducting work, educational, and lifestyle activities within group settings. The two-way protective respirator system can optionally condition the incoming filtered airstream to desired temperature and humidity level conditions in order to make the air more comfortable for the wearer to breathe.

As used in this Application, "harmful airborne contaminant particles and vapor components" mean non-biologic particles made up of a variety of components, including acids (such as nitrates and sulfates), organic chemicals, metals, elements from the soil, dust, soot, and smoke, as well as gas vapor components like aldehydes, acid gases, sulfur dioxide, nitrogen oxides, polyacrylic aromatic hydrocarbons, benzene, toluene, styrene, metals, dioxins, ethylene oxide, formaldehyde, ammonium compounds, naphthalene, coke dust and sulfur, inorganic arsenic, cadmium, methylene chloride, chromium, 1,3-butadiene, and hydrogen sulfide. Airborne contaminant particles also include biologic particles like viruses, bacteria, pathogens, and other microorganisms that cause infections and diseases, all such contaminant particles and vapor components being capable of airborne transmission via droplets, aerosols, or solid particles that can be breathed by persons, or deposited onto hard surfaces that can be transmitted to other persons by means of surface contact.

For purposes of this invention, "group setting" means two or more persons engaged in close proximity to each other in occupational, educational, recreational, cultural, commercial, or lifestyle tasks or activities pertinent to, without limitation, the meat packing, dental, front-line health care, retail store, grocery store, work office, home healthcare, assembly line, school, college or university, live sports, theater, concert, performing arts, drug development, or vaccine development industries, as well as normal daily tasks conducted by persons having compromised immune systems.

As used in this application, "surrounding community" means other persons found within a work, educational, recreational, cultural, commercial, laboratory, or research environment who are positioned close enough to a person exhaling air to be exposed to the transmission of a harmful airborne contaminant particle or vapor component contained therein.

The two-way protective respirator system 10 of the present invention is shown in FIGS. 1-4. As shown in a first embodiment depicted in FIG. 1, it comprises an air intake and filtration module 12 that is connected by means of flexible hose 14 to a respirator 16 that is secured by means of harness 18 to the wearer's (20) face 22, thereby covering the wearer's nose and mouth. Secured to the exterior surface of 24 of respirator 16 and extending downwardly in close proximity to the wearer's chest 24 is gaiter 26. The air intake and filtration module 12 may be conveniently worn and carried by the wearer 20 by means of strap 23 that can be secured around the wearer's shoulder or chest. In this manner, the two-way protective mask system 10 is portable, thereby providing much-needed mobility to a variety of work, educational, recreational, cultural, commercial, and day-to-day tasks of the wearer without impediment or discomfort.

Figure 2:
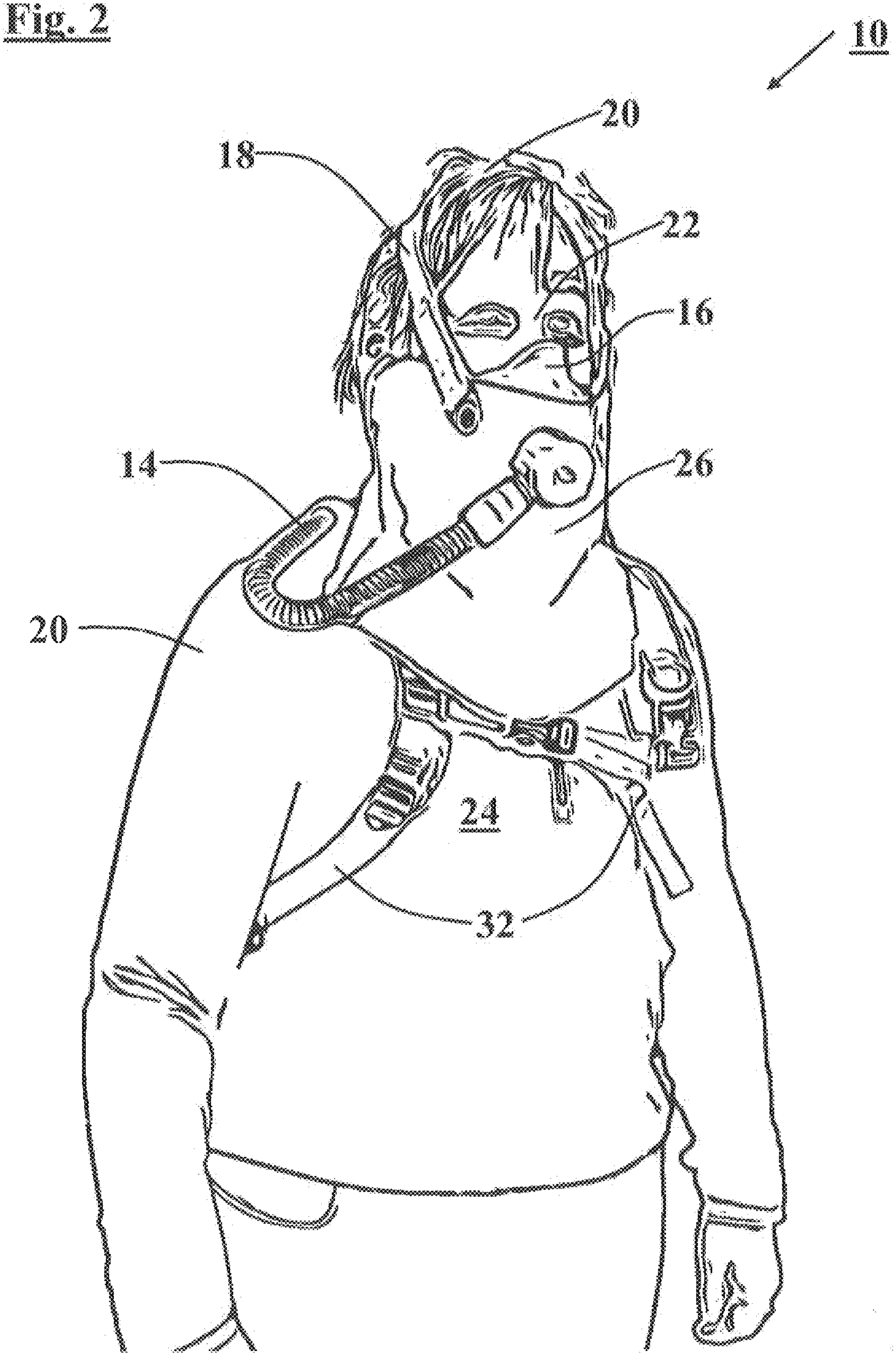
FIG. 2 is a frontal perspective view of a person wearing the backpack embodiment of the two-way protective respirator system of the present invention.
Figure 3:
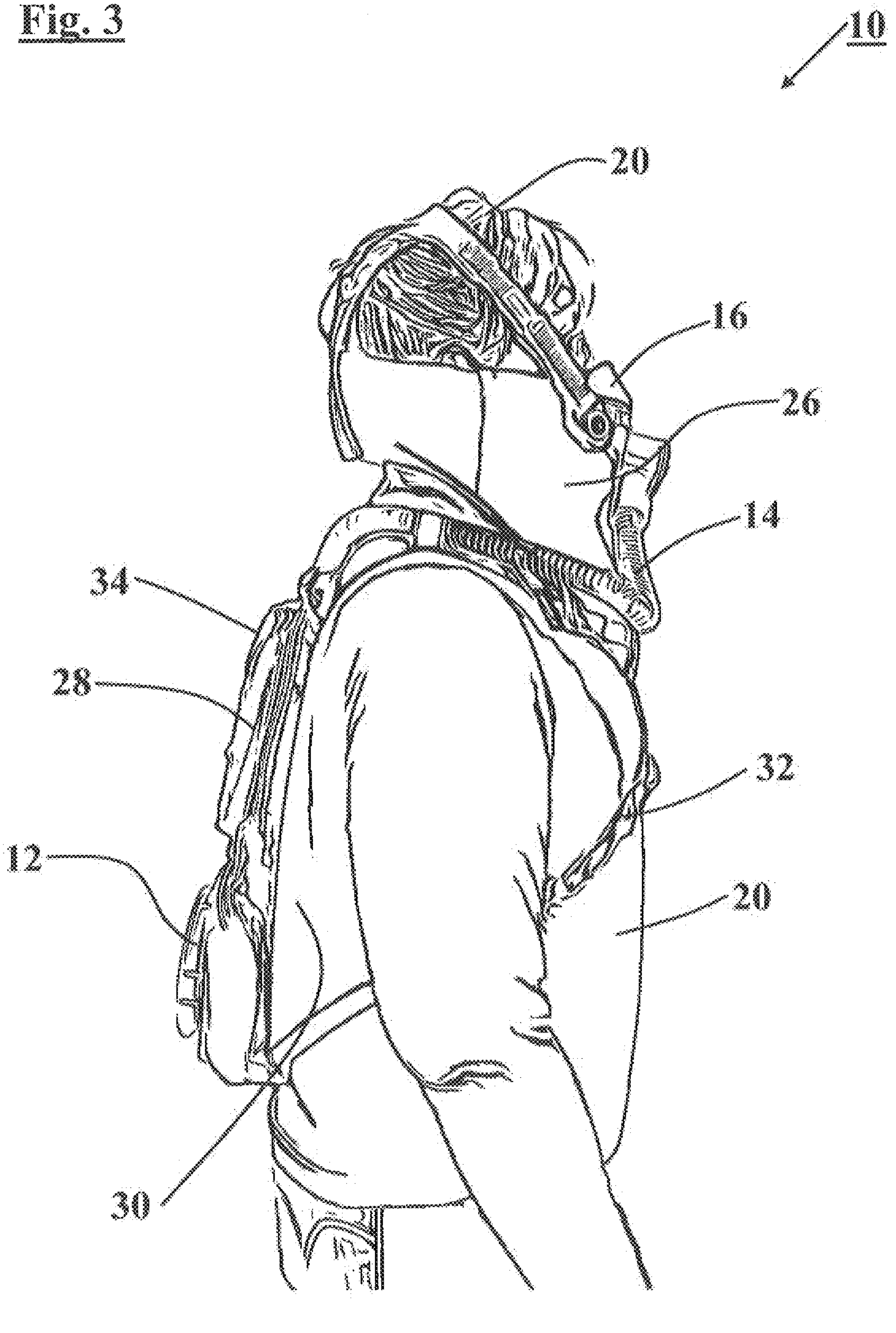
FIG. 3 is a side view of the person wearing the backpack embodiment of the two-way protective respirator system of FIG. 2.
Figure 4:
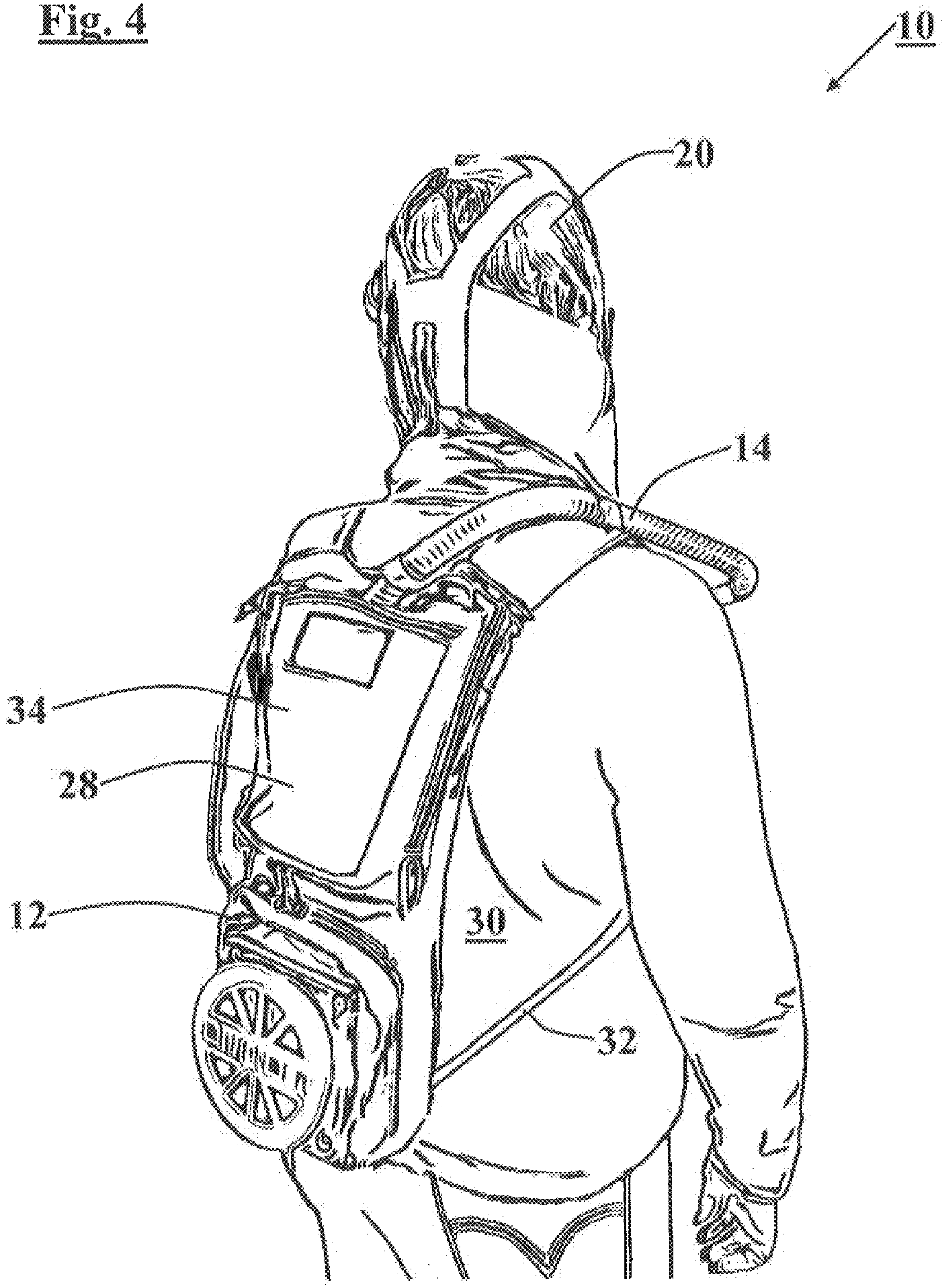
FIG. 4 is a rearward perspective view of the person wearing the backpack embodiment of the two-way protective respirator system of FIG. 2.

In an alternative second embodiment shown in FIGS. 2-4, the air intake and filtration module 12 may be contained inside a backpack 28 that is conveniently worn on the wearer's back 30 by means of straps 32. The hose 14 extends outside the backpack 28 to connect to respirator 16. Some persons may find it more comfortable to wear the air intake and filtration module 12 portion of the two-way protective respirator system 10 on the back, instead of suspended around the shoulder. Moreover, an upper zippered compartment 34 in backpack 28 provides the wearer storage space to carry additional personal items.

Figure 5:
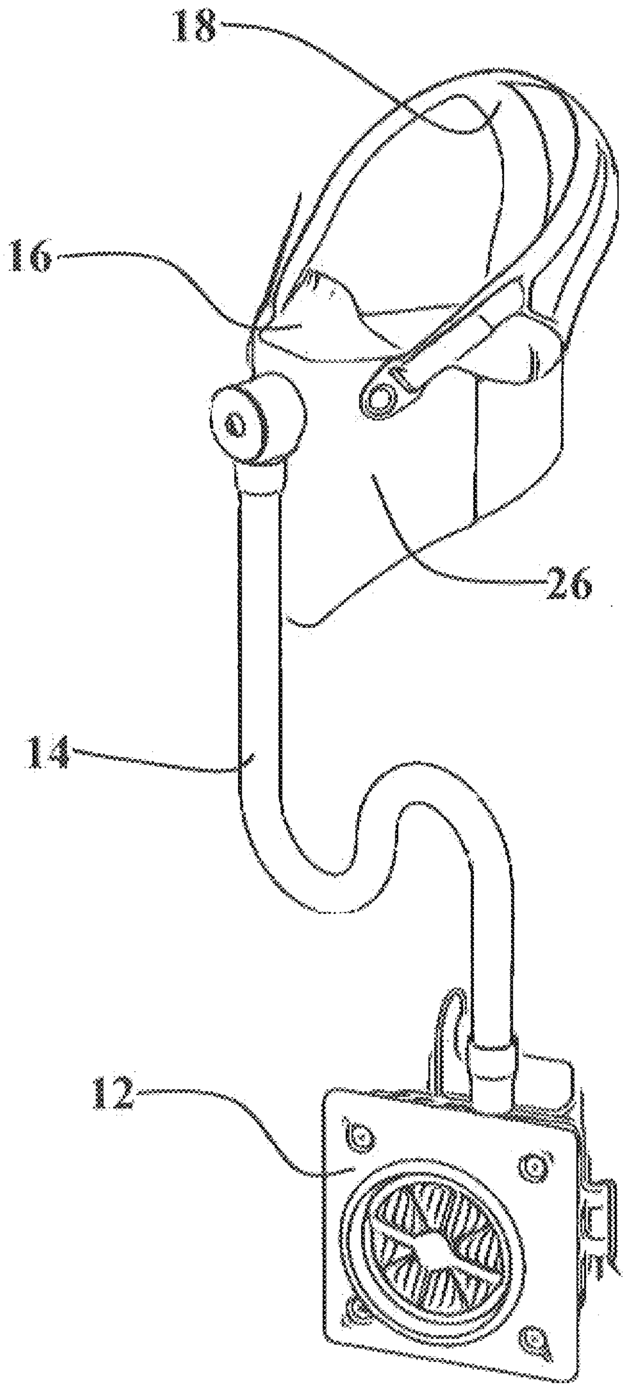
FIG. 5 is a perspective view of the two-way protective respirator system of the present invention.
Figure 6:
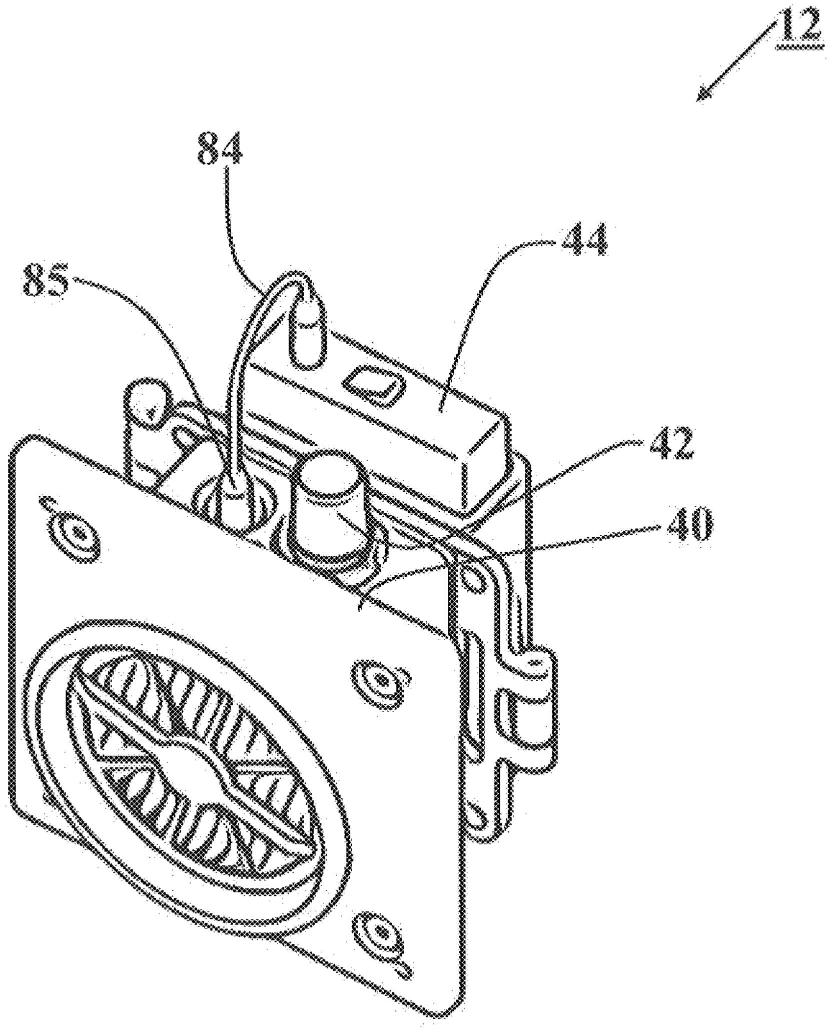
FIG. 6 is a perspective view of the air intake and filtration module of the two-way protective respirator system in its closed position.

The principal components of the two-way protective respirator system 10 are shown more clearly in FIG. 5 outside of backpack 28. The air intake and filtration module 12 is shown more specifically in FIG. 6-8. It comprises an intake air blower fan unit assembly 40, an airflow exit port tube 42, and a battery unit 44 for providing a ready source of electrical current to the cooling blower fan unit 40.

Figure 9:
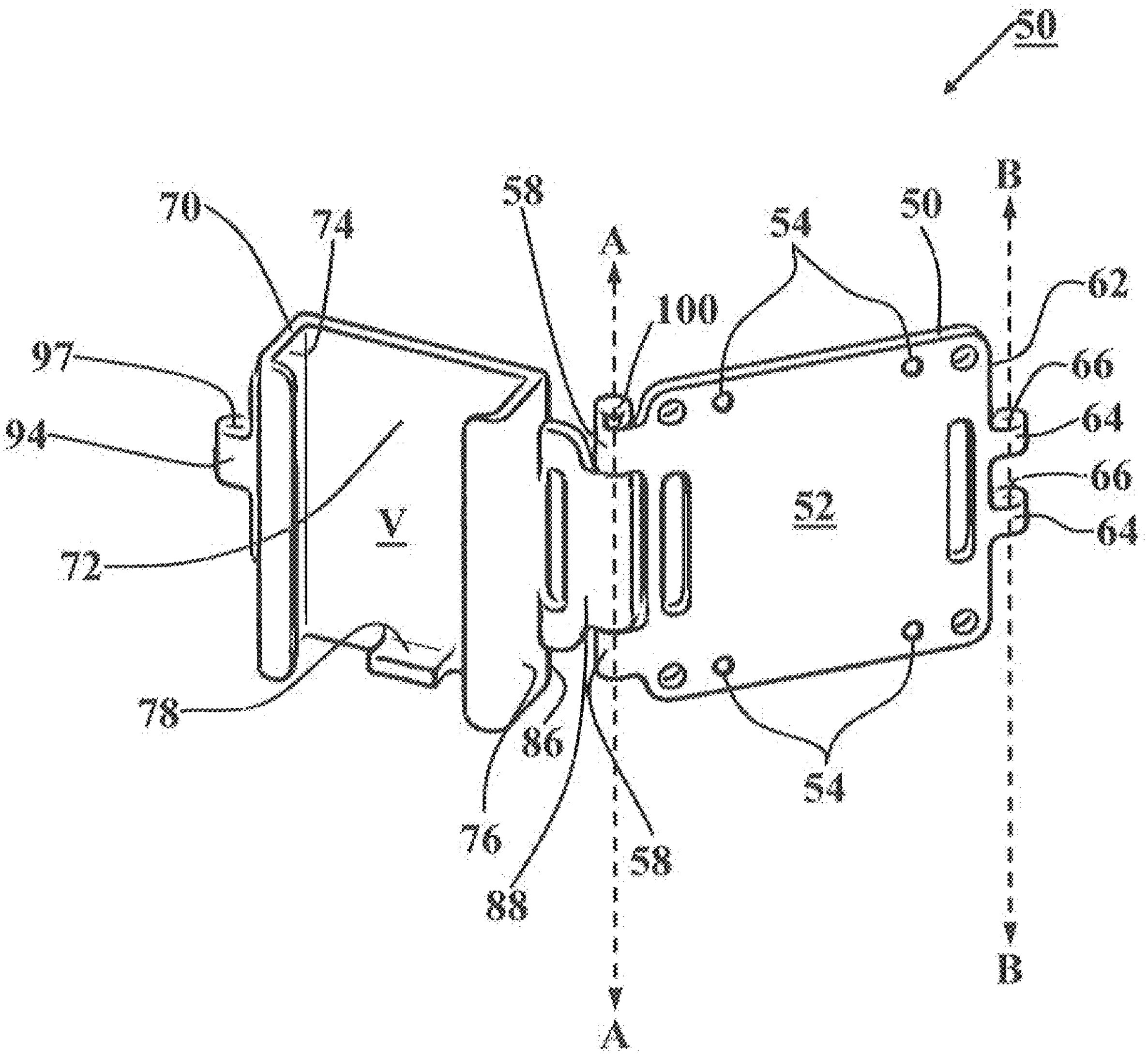
FIG. 9 is a frontal perspective view of the support frame and support bracket for the air intake and filtration module in their hingably-opened position.
Figure 10:
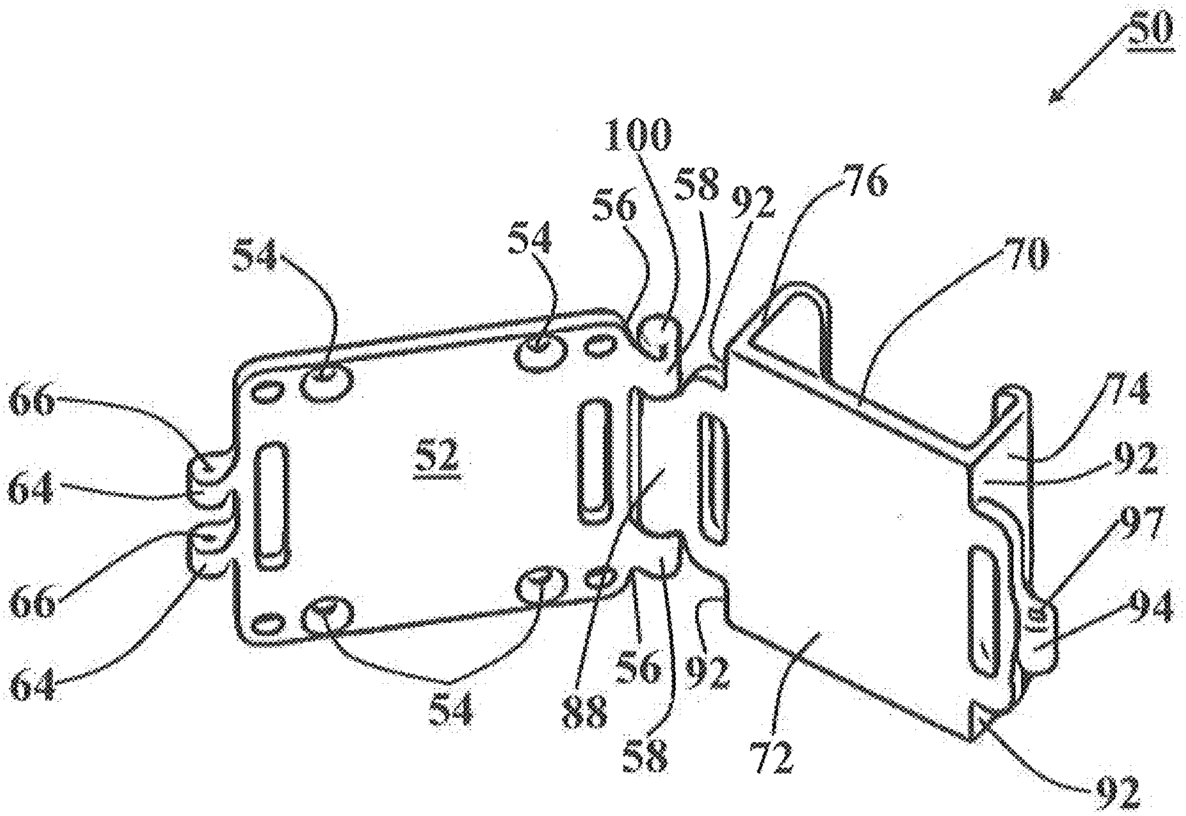
FIG. 10 is a rearward perspective view of the support frame and support bracket for the air intake and filtration module of FIG. 9.

The support frame 50 for the air intake and filtration module 12 is shown in FIGS. 9-10. It comprises a base plate 52 having four threaded holes 54 formed therein. Extending from one edge 56 of base plate 52 are a pair of lugs 58 having through bores 60 (not shown) formed therein along a common axis A-A. Extending from the opposite edge 62 of the base plate 52 are a second pair of lugs 64 having through bores 66 formed therein along a common axis B-B.

The support frame 50 also comprises support bracket 70 comprising a central wall 72, two side walls 74 and 76 extending perpendicularly from the central wall, and foot support 78 extending perpendicularly from central wall 72. Central wall 72, side walls 74 and 76, and foot support 78 cooperate to form an interior volume V. This interior volume V is dimensioned to accommodate battery pack 80 shown in FIG. 11.

Extending from edge 86 of support bracket side wall 76 is lug 88 having through bore 96 (not shown) formed therein. Extending from opposite edge 92 of support bracket side wall 74 is lug 94 having through bore 97 formed therein.

Figure 7:
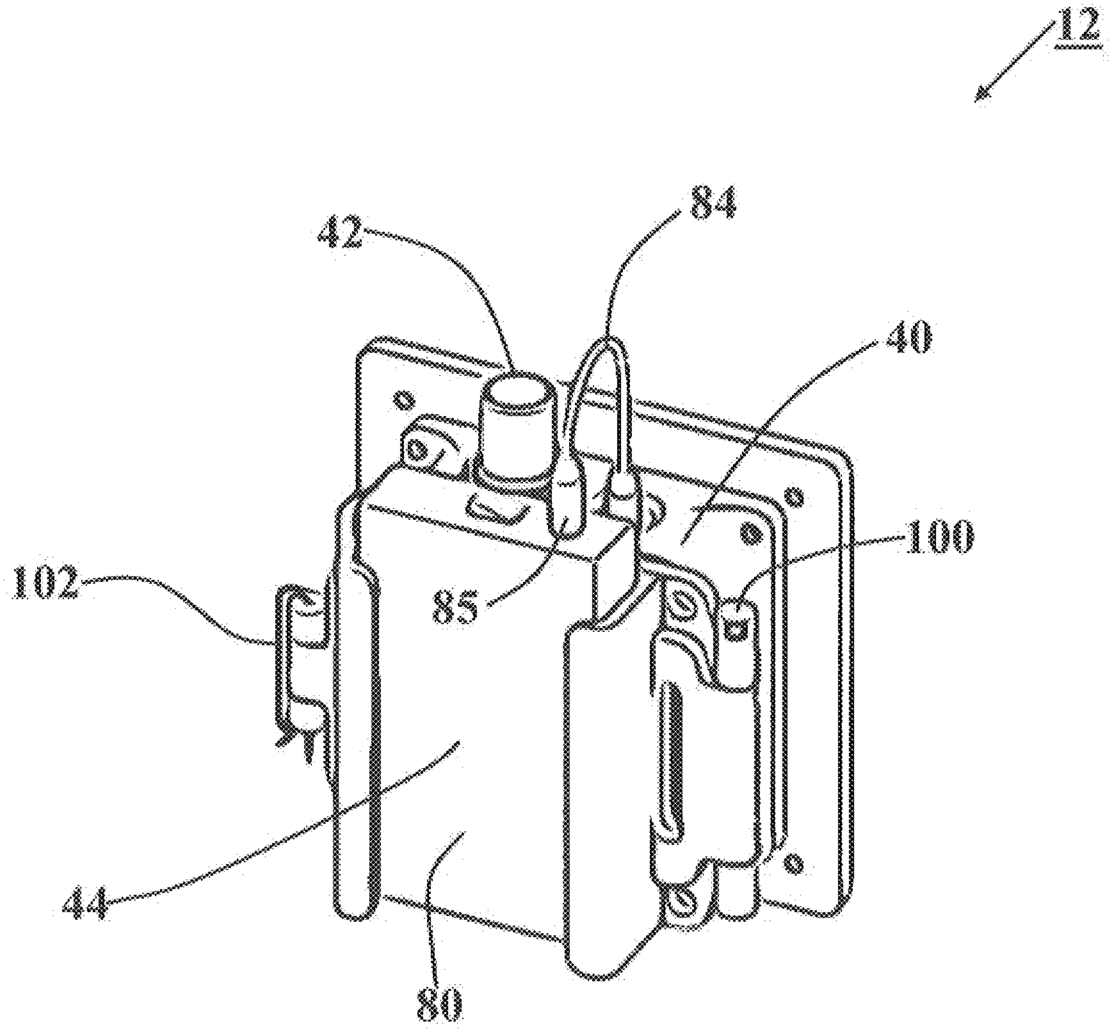
FIG. 7 is an opposite perspective view of the air intake and filtration module of FIG. 6.
Figure 8:
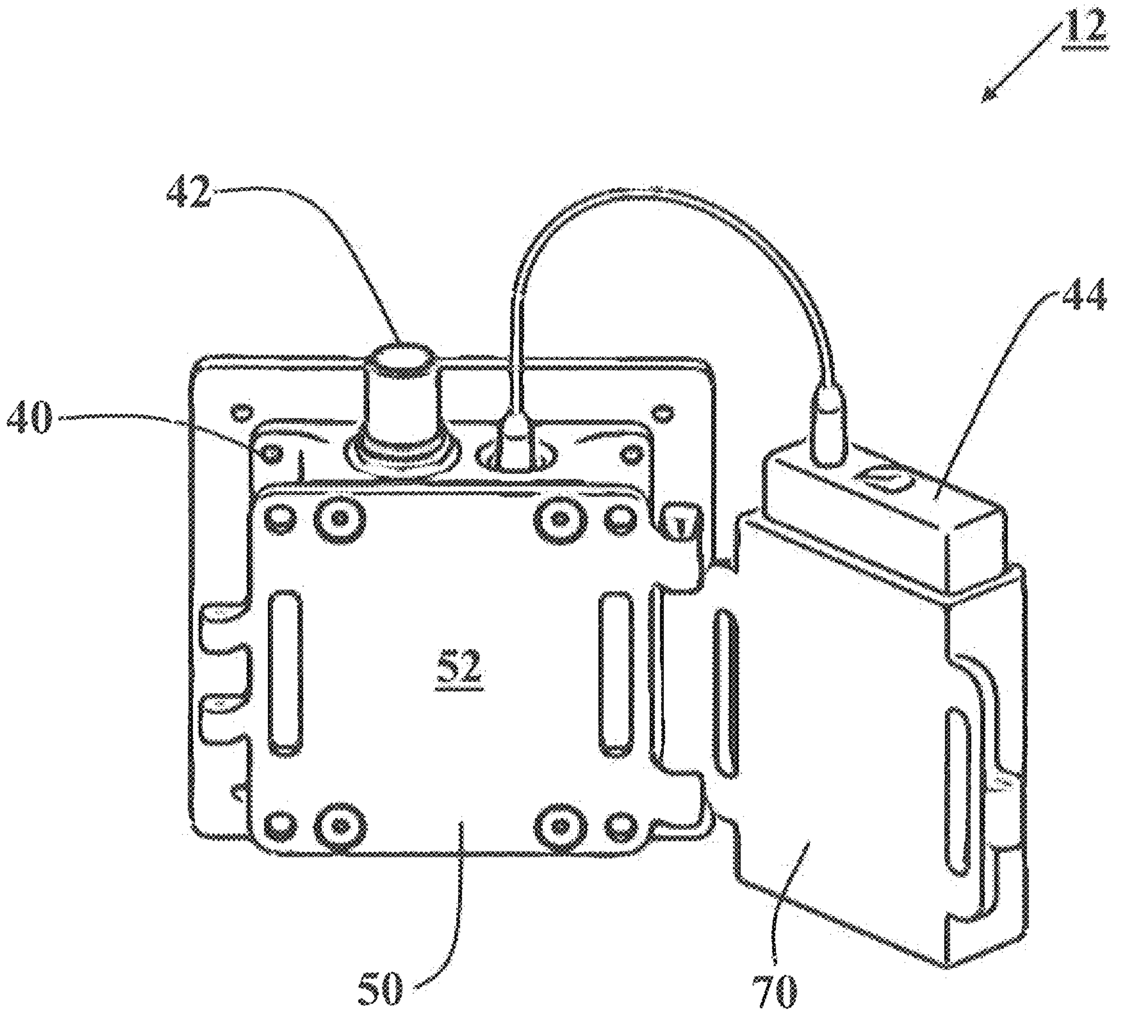
FIG. 8 is a perspective view of the air intake and filtration module of FIG. 6 in its opened position.

Lug 88 of support bracket 70 is inserted in between lugs 58 of base plate 52 with the through bores 60 of lugs 58 and through bore 96 of lug 88 axially aligned. Bolt 100 is inserted through these through bores 60 and 96 of lugs 58 and 88, respectively, so that base plate 52 and support bracket 70 are hingably connected to each other. In this manner, the support bracket 70 containing battery pack 80 can be folded against base plate 52 to which the intake air blower fan unit 40 is attached to form the air intake and filtration module assembly 12, as shown in FIG. 7. Clip 102 is inserted through bores 97 and 66 of lugs 94 and 64, respectively, to secure the base plate 52 and support bracket 70 in this assembled manner.

Figure 12A:
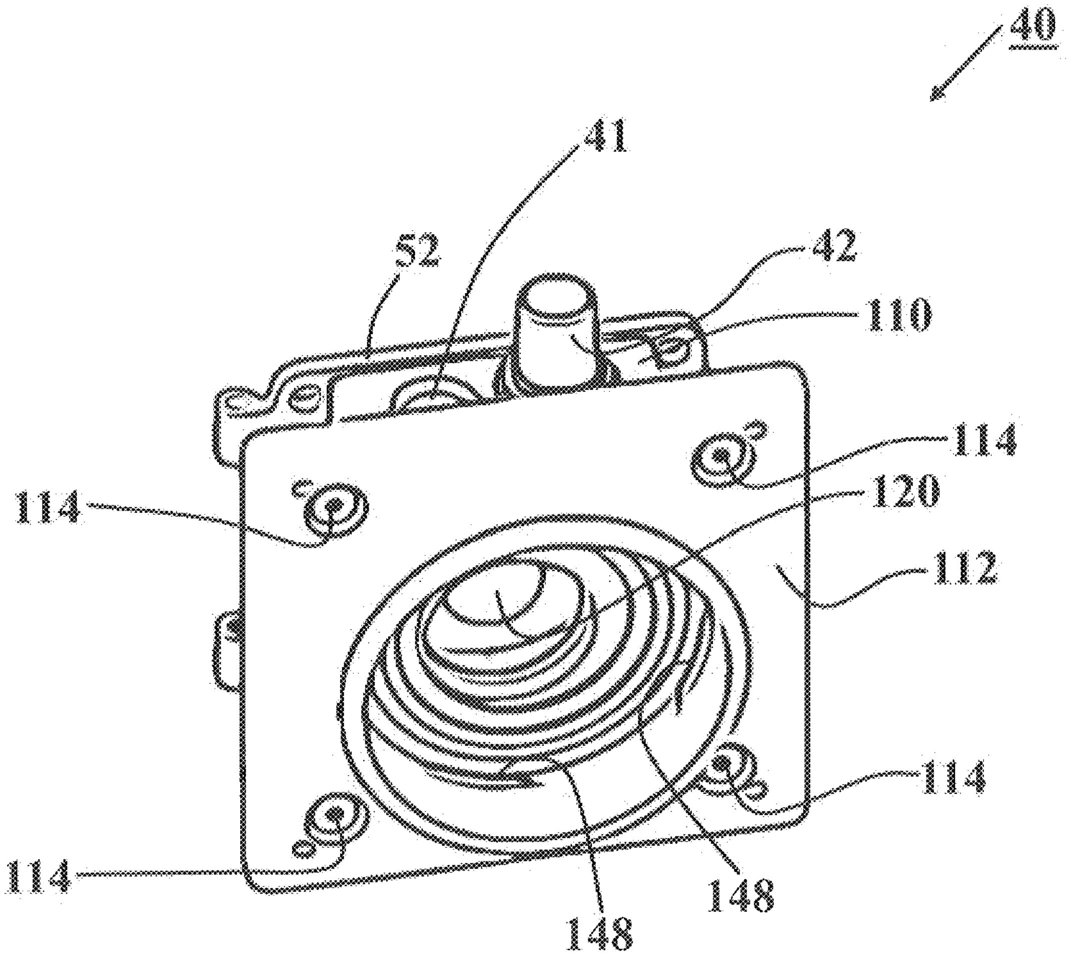
FIG. 12*a* is a frontal perspective view of the air intake blower fan unit with the filtration media removed.
Figure 12B:
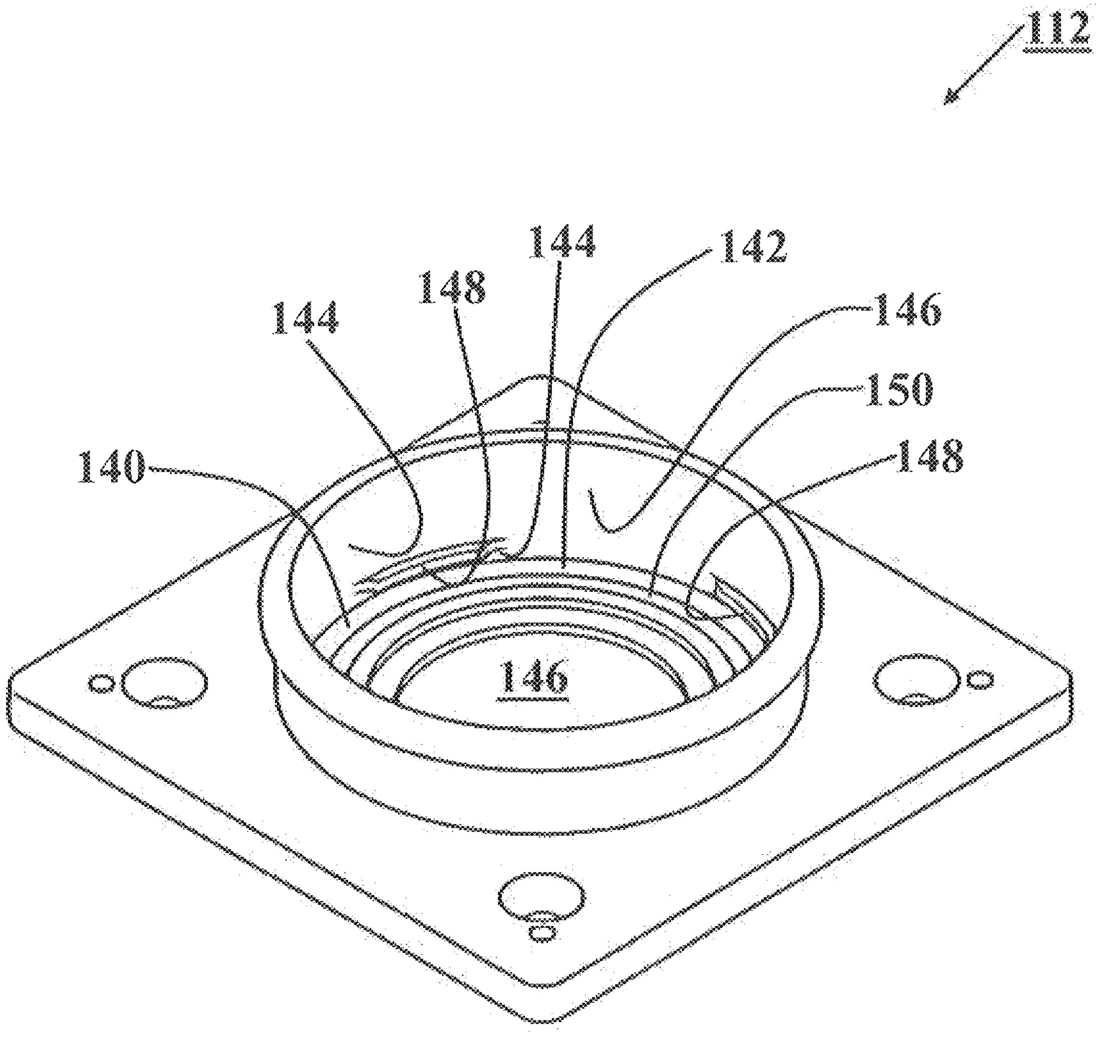
FIG. 12*b* is a perspective view of the face plate of the air intake blower fan unit of FIG. 12*a*.
Figure 13:
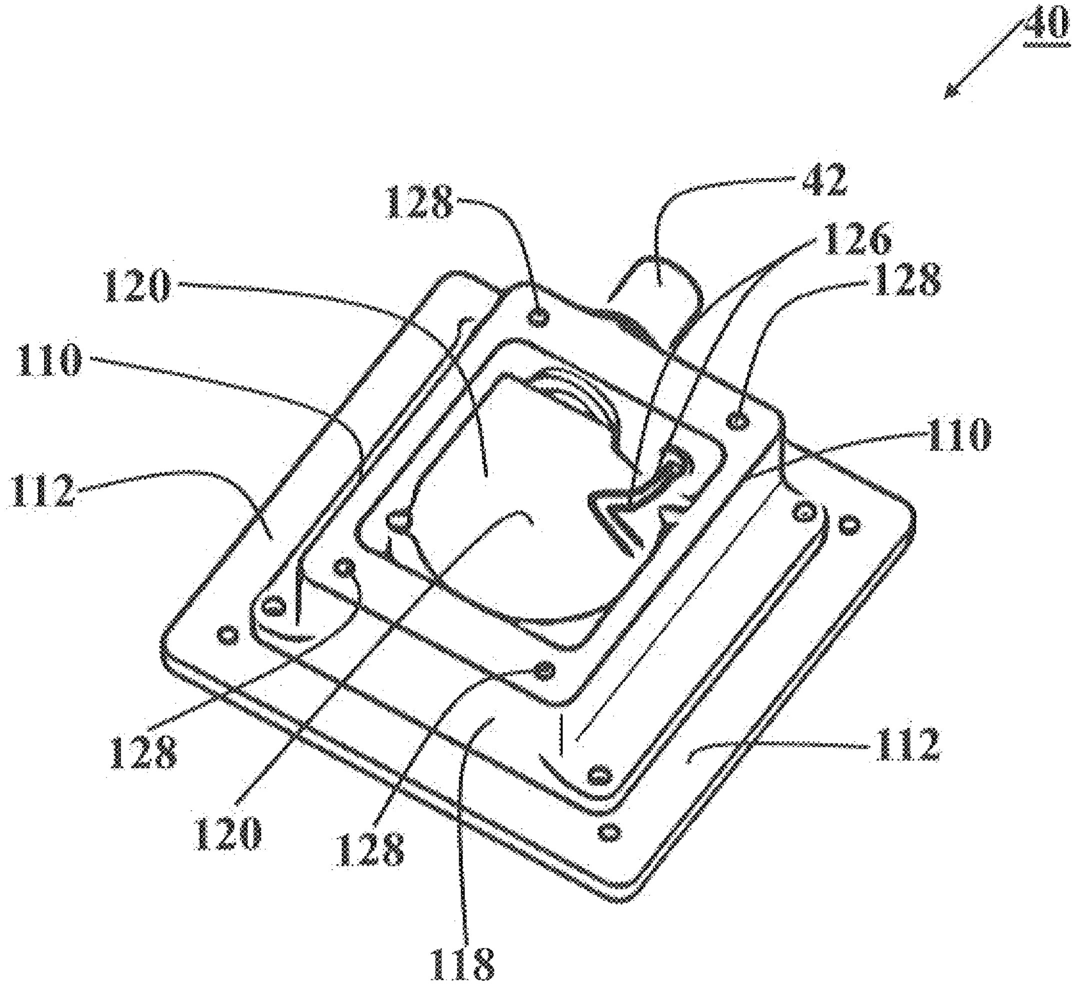
FIG. 13 is a rearward perspective view of the air intake blower fan unit of FIG. 12*a* disconnected from the support frame.

The intake air blower fan unit 40 is shown in greater detail in FIGS. 12*a*, 12*b*, and 13. It comprises housing 110 to which face plate 112 is secured by means of a plurality of bolts 114. Housing 110 comprises back wall 116 and side walls 118 defining an interior volume $V_2$ of housing 110. An air intake blower fan 120 is inserted into interior volume $V_2$ of housing 110.

Figure 14A:
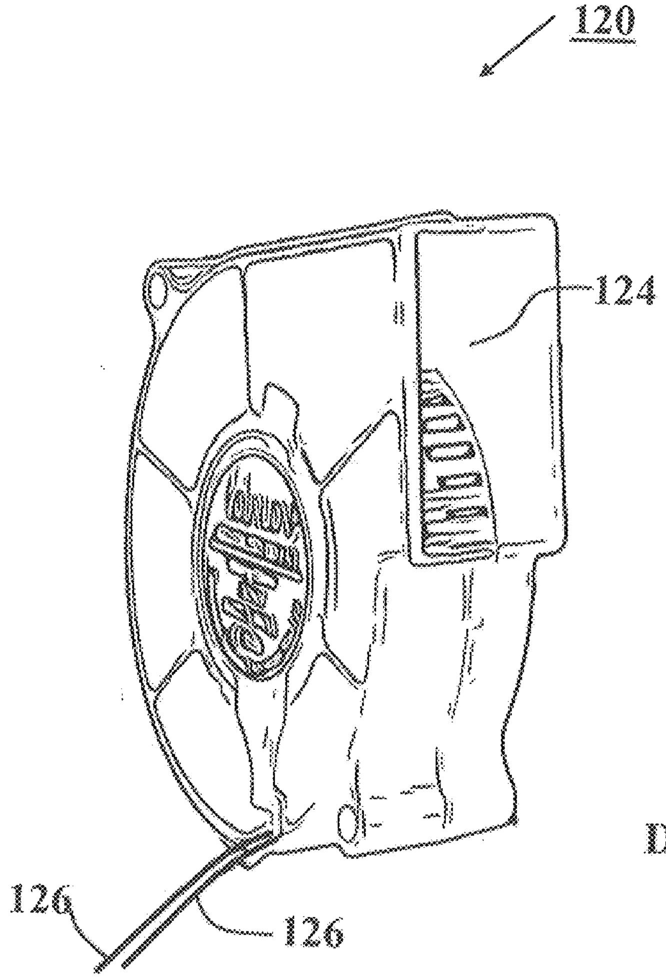
FIGS. 14*a* and 14*b* are perspective views of the blower fan for the cooling blower fan unit.
Figure 14B:
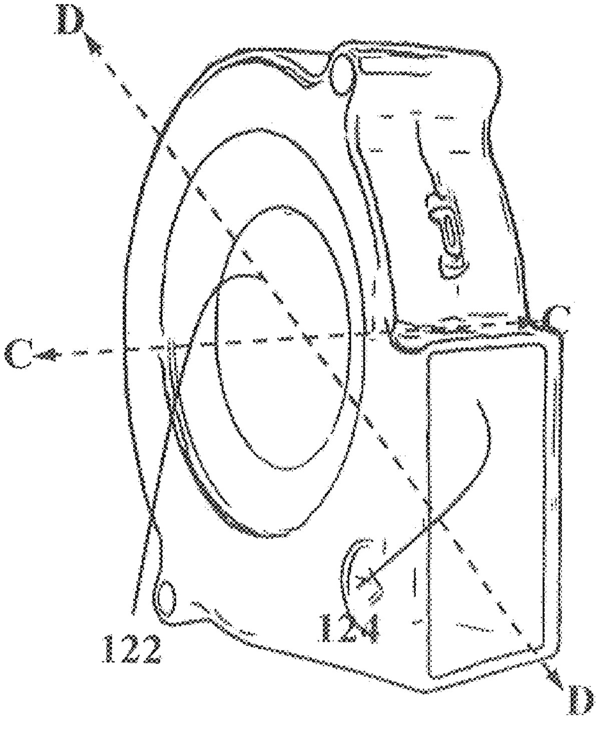

This air intake blower fan 120 is shown in greater detail in FIGS. 14*a* and 14*b*. It is preferably a centrifugal blower fan that pulls air in along axis C-C and pushes it out at a 90° angle along a second axis D-D. Suitable cooling blower fans may be sourced from Coultran Industrial Supply, Inc. of City of Industry, California. It should comprise a DC 12V fan unit operating its fan blades at a speed of about 3000-3200 rpm, and producing an outlet airflow of about 13-40 cfm. As shown in FIGS. 14*a*-14*b*, this air intake blower fan unit 120 has an inlet port 122 and in outlet port 124. A pair of wires 126 delivers electrical current to the fan unit. Air inflow enters fan 120 via inlet port 122 whereupon its velocity is increased to the about 13-40 cfm value.

This processed air stream exits the fan 120 via outlet port 124, which is attached to exit port tube 42 attached to housing 110. This air stream will feel fresh to the wearer when it is delivered to respirator 16 for easier breathing.

A plurality of threaded bores 128 formed around the perimeter of housing 110 (see FIG. 13) accommodate a plurality of bolts 130 that are used to secure cooling blower fan unit 40 to threaded apertures 54 of base plate 52 of support frame 50 (see FIG. 10).

While the air intake blower fan unit 120 may preferably produce an airflow of about 12-40 cfm, this airflow will be reduced by the time that it travels through flexible hose 14 to respirator 16 (see FIG. 5). The airflow delivered to the nose cup in respirator 16 should be about 3-10 cfm, preferable about 4 cfm.

Figure 11:
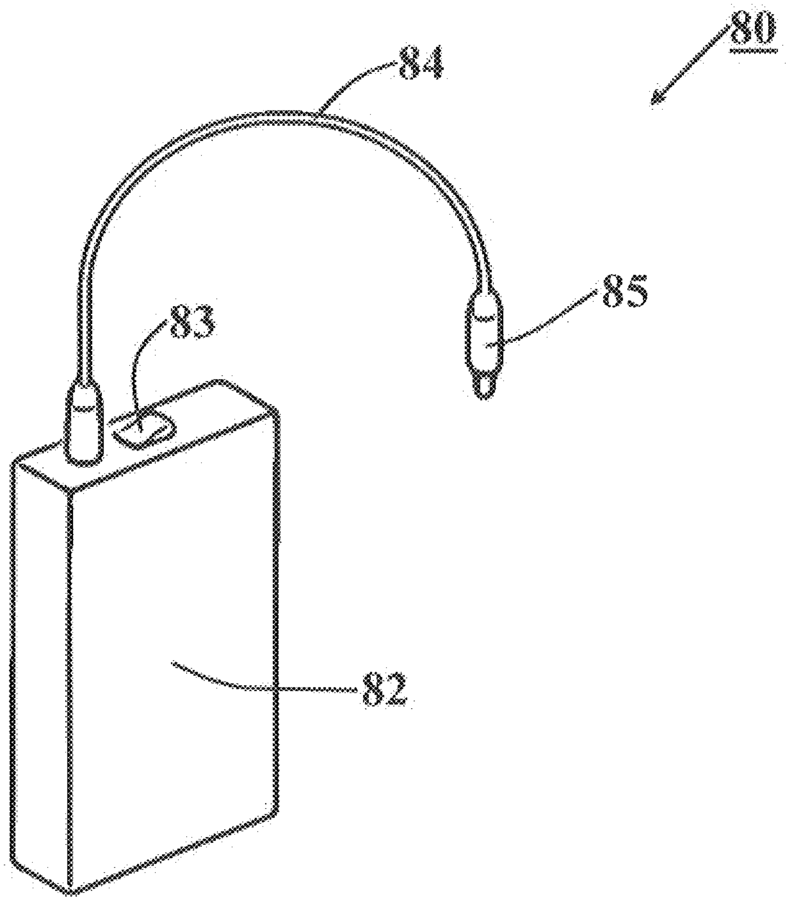
FIG. 11 is a perspective view of the battery pack for the air intake and filtration module.

A battery pack 80 is shown in FIG. 11 for providing a source of electrical current for the air intake blower fan unit 120. The battery pack comprises a housing 82 containing the battery cells. The battery cells may be alkaline or nickel cadmium, but they are preferably lithium ion battery cells. A conductor 84 extends from the exterior of the battery housing 82 to connector 85 at its distal end. A toggle switch 83 mounted on battery housing 82 permits the wearer to turn the battery pack 80 on or off. The connector 85 may be plugged into inlet 41 of cooling blower fan unit assembly 40 (see FIGS. 6-7 and 12). In this manner, electrical current can be delivered upon demand by battery pack 80 to air intake blower fan 120 in order to operate the air intake blower fan as described below. Meanwhile, interior volume V of support bracket 70 (see FIG. 9) is dimensioned to accommodate battery pack 80 so that it may be securely contained within the air intake blower fan unit assembly 40 of the two-way protective respirator system 10 of the present invention.

FIGS. 12*a* and 12*b* show face plate 112 of air intake blower fan unit 40 in greater detail. Formed within base plate 112 is annular recess 140 comprising back wall 142 and circular side wall 144. A hole 146 is formed within back wall 142 within the central portion of base plate 112. A plurality of keys 148 extend from circular side wall 144 and annular channel 150 is formed within back wall 142 surrounding hole 146.

Figure 15:
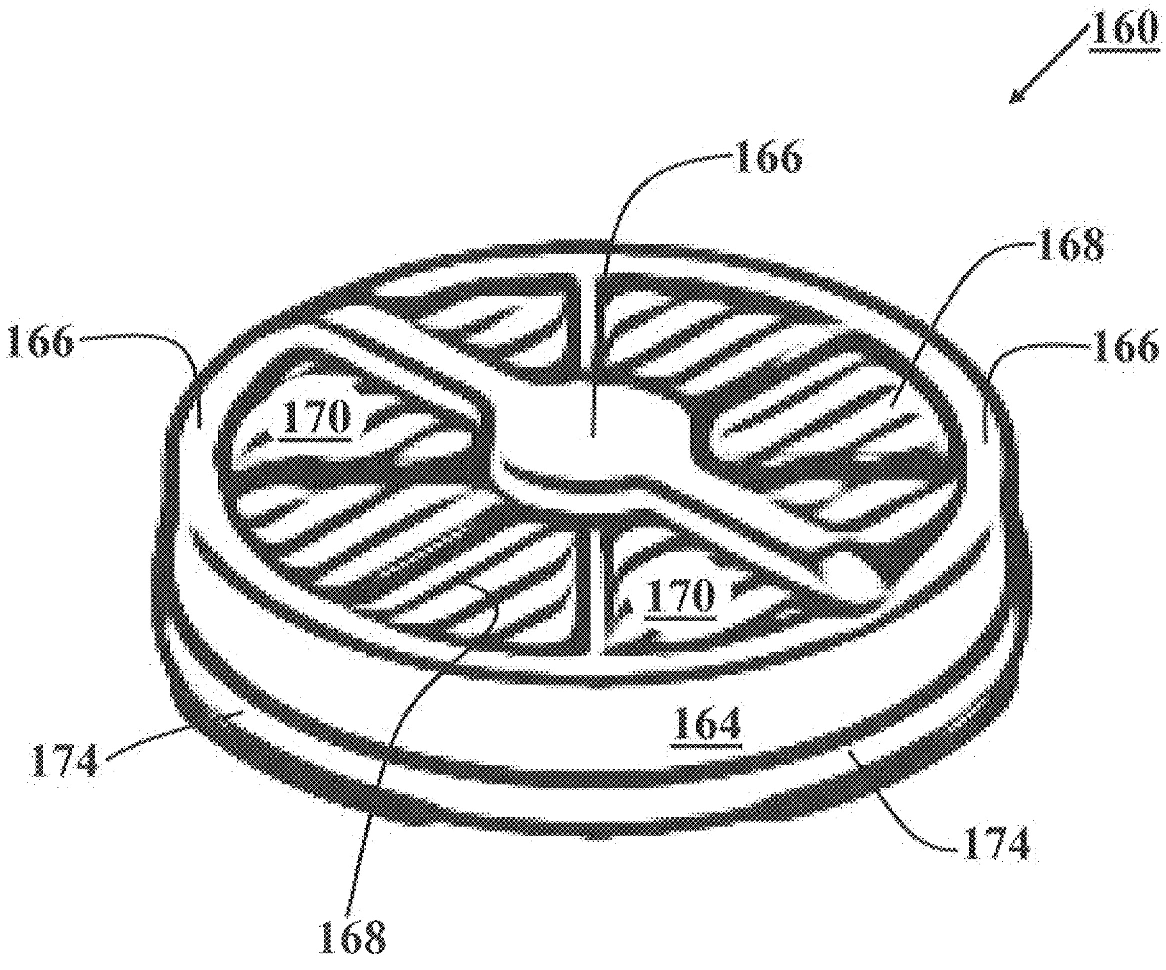
FIG. 15 is a top perspective view of the filter unit for the cooling blower fan unit.
Figure 16:
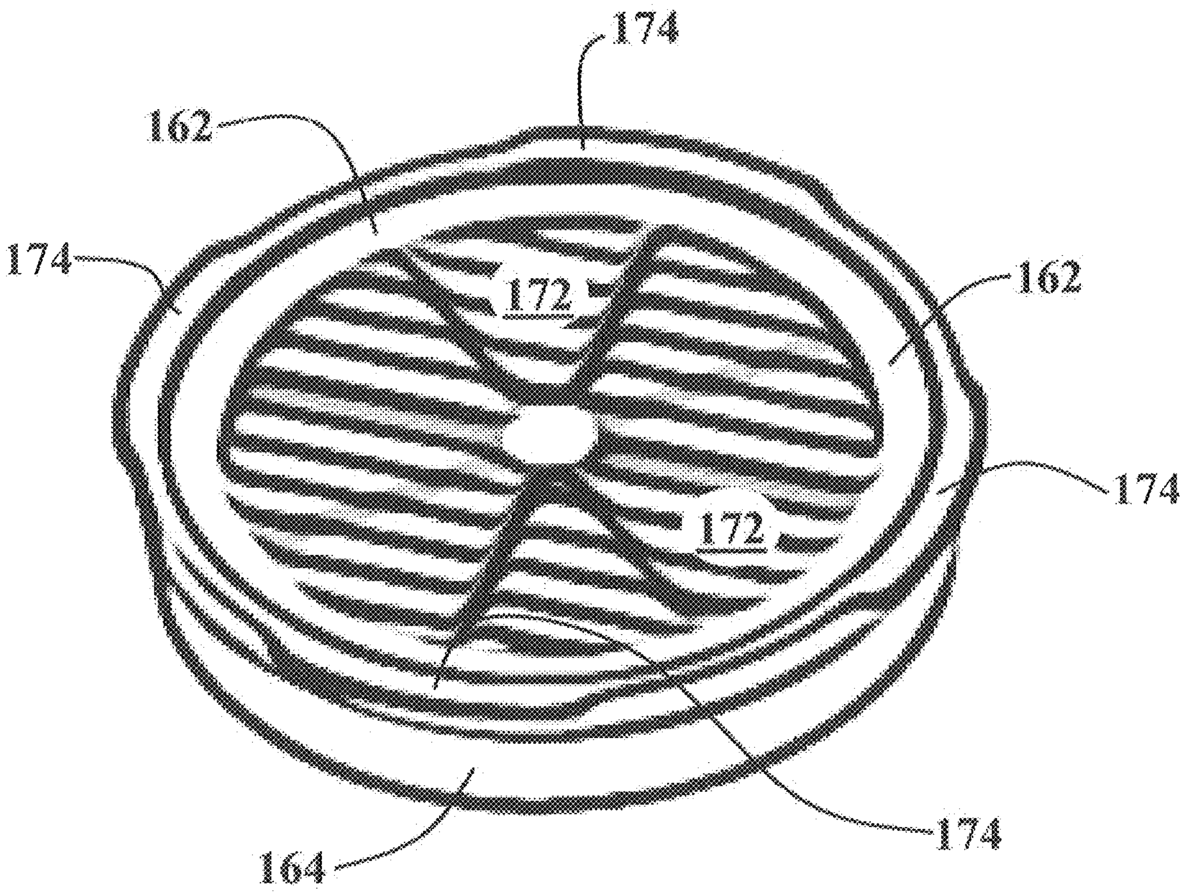
FIG. 16 is a bottom perspective view of the filter unit for the cooling blower fan unit of FIG. 15.

Filter unit 160 is shown in greater detail in FIGS. 15-16. It is preferably round in shape, although other shapes like squares and rectangles also may be used. The filter unit 160 comprises a bottom annular wall 162, circular side wall 164 surrounding the bottom wall's perimeter, and top wall 166. Entrapped inside the interior volume $V_3$ of this filter housing 166 formed by the bottom wall 162, side wall 164, and top wall 166 is a filtration media 168. A plurality of apertures 170 and 172 formed within top wall 166 and bottom wall 162, respectively allow atmospheric air to freely flow into and out of filtration media 168. A plurality of keys 174 extend from the perimeter of bottom wall 162 of the filter housing 166.

The filtration media 168 may comprise any suitable mechanical, physical or electrostatic means for removing viruses, bacteria, and other undesirable airborne contaminant particles from the incoming airstream that enters the filtration media. Examples of such filtration media 168 include pleated hydrophobic filters, electrostatic filters that use static electricity to catch airborne contaminant particles as they pass through the filters media and activated carbon, as well as ultra violet light that may be cast upon microbial contaminants to kill the bacteria and viruses therein. Such filter media 168 should be capable of removing particles that are 0.1-1.0 μm in size from the air stream, preferably particles below 0.3 μm in diameter. The filter media 168 should preferably comprise a true High Efficiency Particulate Air ("HEPA") filter that is capable of removing 99.7% or more of all particles that are 0.3 μm or greater in diameter, or a medical-grade HEPA filter that can trap 99.95-99.995% of such particles.

The filter unit 160 is secured to the face plate 112 of the cooling blower fan unit 40 by means of inserting it into the annular region defined by back wall 142 and circular side wall 144. The filter unit housing 166 is then rotated so that keys 174 extending outwardly from bottom wall 162 of filter housing 166 slide under and are entrapped by keys 148 extending inwardly from face plate 112 of air intake blower fan unit face plate 112 (see FIGS. 15 and 12*b*).

Figure 17:
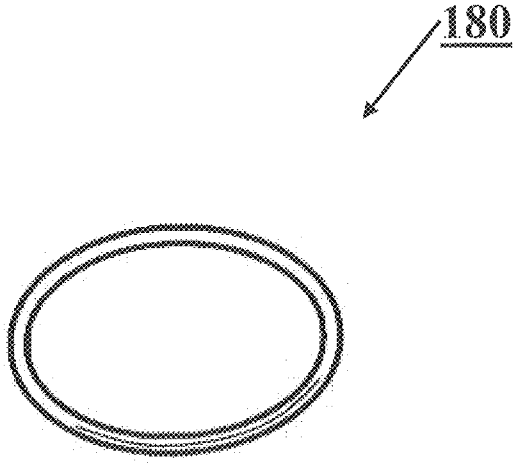
FIG. 17 is a perspective view of the O-ring contained inside the assembled cooling blower fan unit.

A circular O-ring 180 shown in FIG. 17 may be inserted into annular channel 150 formed within back wall 142 of air intake blower fan face plate 112 (see FIG. 12*b*). O-ring 180 is therefore positioned between the bottom wall 162 of filter housing 166 and back wall 142 of face plate 112 to ensure that only air that passed through filtration media 168 may enter blower fan unit 40. In this manner, viruses, bacteria, and other airborne contaminant particles contained in the ambient air are reliably removed from the incoming air stream drawn into the air intake blower fan unit 40 for delivery though outlet tube 42 via flexible hose 14 to respirator 16 (see FIG. 5).

The two-way protective respirator system 10 of the present invention may also be used to protect the wearer from vapor contaminants contained in the ambient air. For example, firefighters combatting large forest fires often must breath smoke that contains, in addition to carbon monoxide, carbon dioxide, and particulate matter like soot, dangerous organic vapors like aldehydes, acid gases, sulfur dioxide, nitrogen oxides, polyacrylic aromatic hydrocarbons, benzene, toluene, styrene, metals, and dioxins. Left untreated, these harmful vapor components can badly injure or kill the firefighters.

Likewise, industrial plant workers can come into contact with a variety of dangerous fumes generated by the manufacturing processes, including or caused by the use of highly concentrated chemicals during production. Examples include ethylene oxide, formaldehyde, ammonium compounds, naphthalene, coke dust and sulfur, inorganic arsenic, cadmium, toluene, methylene chloride, chromium, benzene compounds, 1,3-butadiene and hydrogen sulfide. While manufacturing plants may be required to operate large filters to process the air containing these hazardous vapors and gases, employees may need additional protection.

Figure 18:
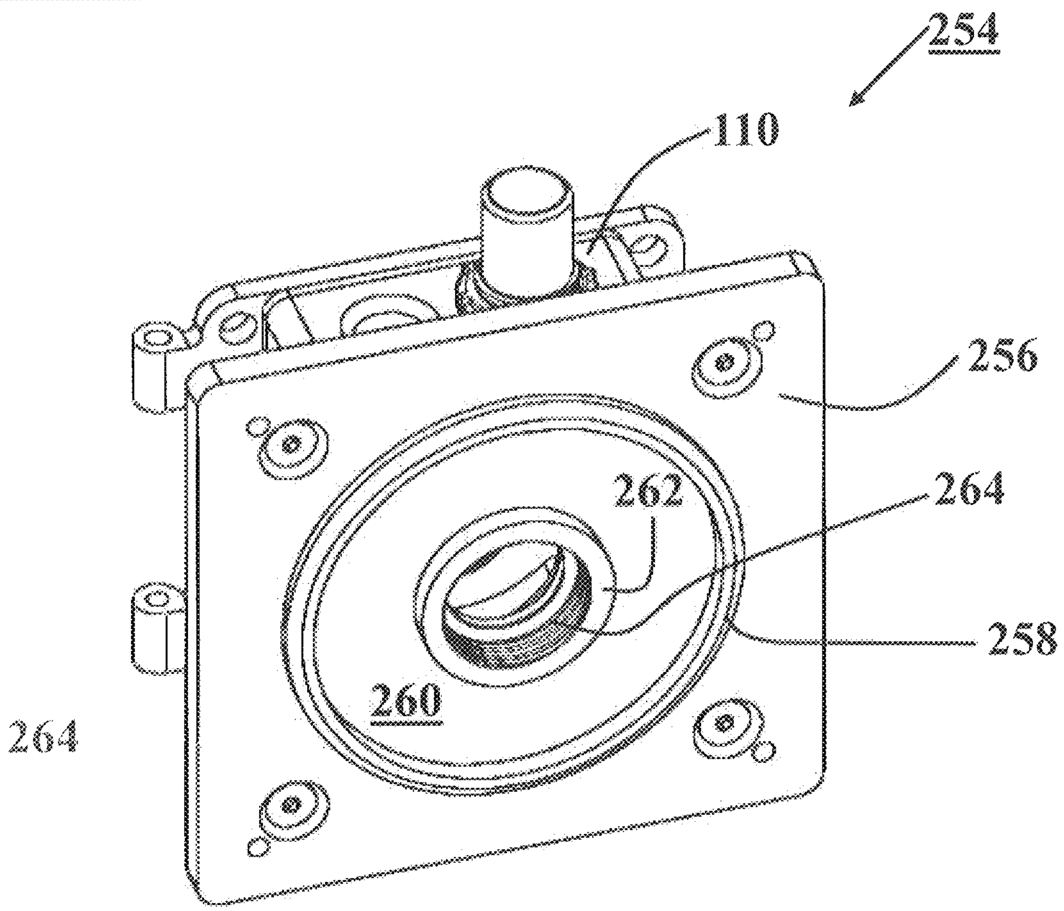
FIG. 18 is a perspective view of an alternative embodiment of the air intake blower fan unit with the NATO filter cartridge removed.

Thus, another embodiment 250 of the two-way protective respirator system of the present invention (see FIGS. 8-21) uses a NATO filter cartridge 252 in place of the pleated filtration media 168 shown in FIGS. 15-16. As shown in FIG. 18, air intake blower fan unit 254 is similar to the air intake blower fan unit 40 of FIG. 12 with the exception that face plate 256, which is secured to housing 110, comprises an outer ring wall 258 surrounding an annular region 260 further defined by inner ring wall 262. The inner ring wall 262 surrounds aperture 264 formed at the center of ace plate 256. The face plate wall around aperture 264 bears internal thread 266 (e.g., 40 mm threads).

Figure 19:
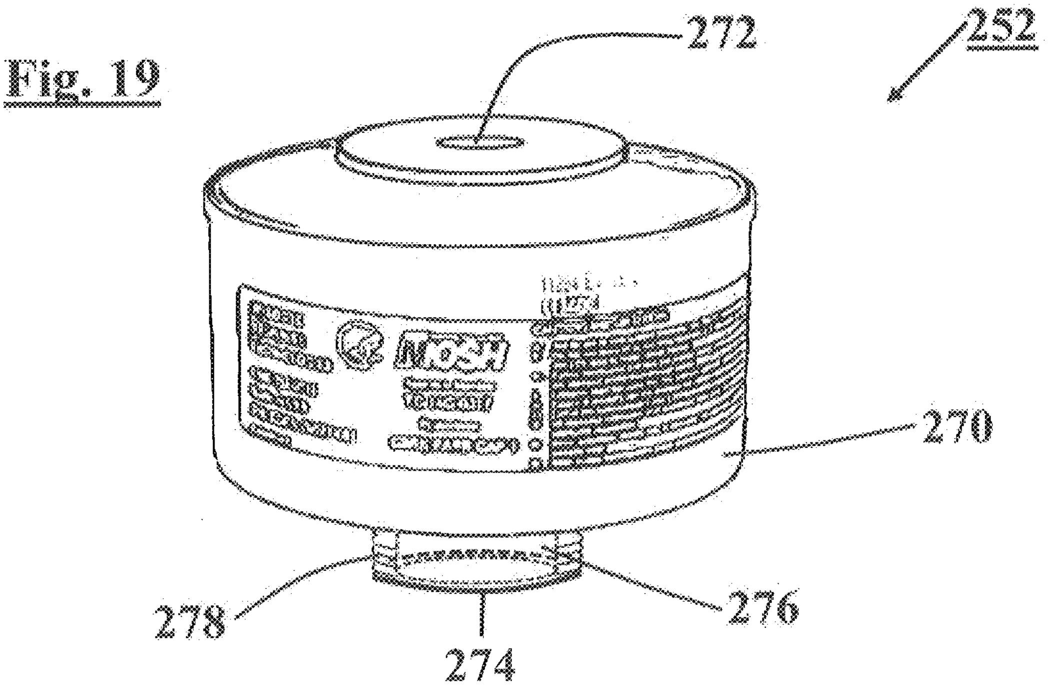
FIG. 19 is a perspective view of the NATO filter cartridge.
Figure 20:
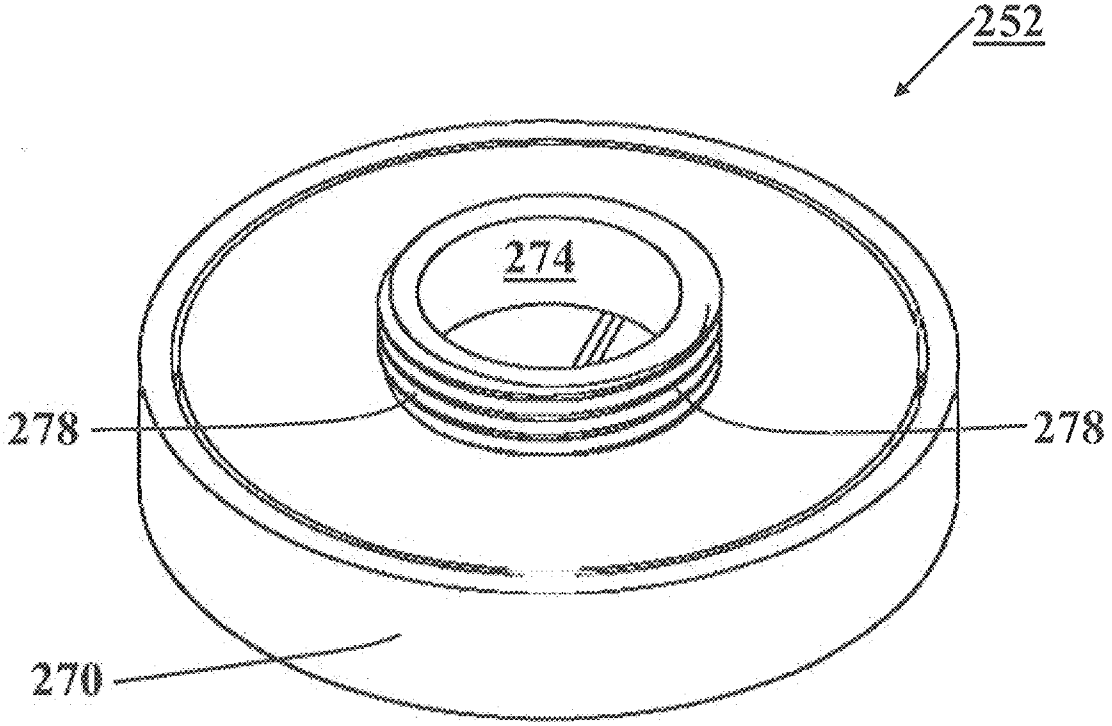
FIG. 20 is bottom perspective view of the NATO filter cartridge.
Figure 21:
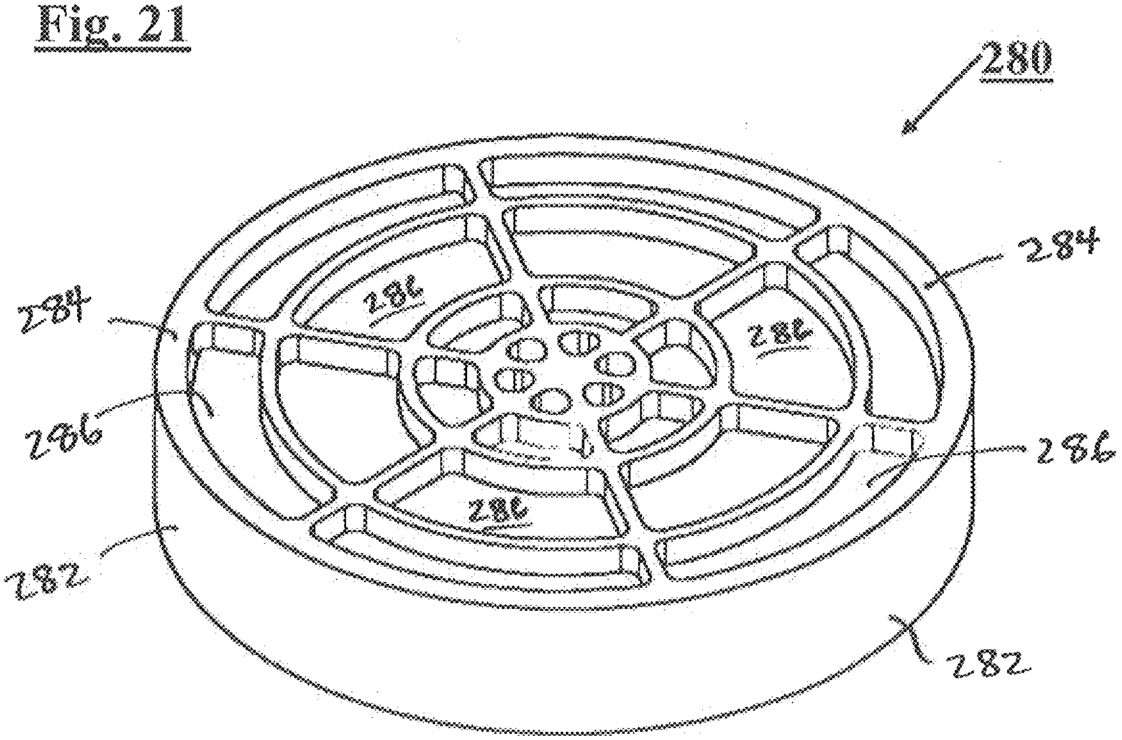
FIG. 21 is a perspective view of an alternative NATO filter cartridge embodiment containing a HEPA filter and activated carbon.

The NATO filter cartridges 252 shown in FIGS. 19-20 are available from a variety of suppliers like 3M Corp. of St. Paul, Minnesota They are designed to be used in gas masks worn by troops seconded to the North Atlantic Treaty Organization during battles and other hostile encounters. They comprise a housing 270 having an air inlet aperture 272 and an air outlet aperture 274 defined by annular wall 276 having external threads 278.

The NATO filter cartridge 252 is mounted to face plate 256 of air intake blower fan unit 254 by means of seating its bottom surface inside annular region 260 with annular wall 276 extending therefrom inserted into aperture 264 of face plate 256 and the external threads 278 of annular wall 276 of the NATO filter cartridge 252 screwably engaging the internal threads 266 of the aperture 264 formed within the face plate. In this manner, all ambient air drawn by the air intake blower fan 120 will pass through inlet aperture 272 of NATO filter cartridge 252 and through the separation media 280 contained inside with the treated air stream passing through aperture 264 in face plate 256 into housing 110 of air intake blower fan unit 254, whereupon it can be delivered by flexible hose 14 to respirator 16 worn by the person 20.

The separation media 280 contained inside housing 270 of the NATO filter cartridge 252 may comprise activated carbon which is useful for adsorbing chemical elements and compounds contained inside hazardous vapors and gases. Any filter cartridge holding a NBC rating (Nuclear, Biological, and Chemical) is suitable for purposes of the two-way protective respirator system 10 of the present invention. Suitable activated carbon-based NATO filter cartridges 252 may be sourced from 3M Corp.

Even more advantageously, combination activated carbon/HEPA filter NATO filtration cartridges 280 (see FIG. 21) may be sourced from 3M Corp. Such cartridges 280 have a housing 282 with a top surface 284 featuring a plurality of inlet regions 286 for incoming ambient air. A HEPA filter 288 is contained within the top portion of housing 282 with a volume of activated carbon contained inside the lower portion. In this matter, ambient air drawn into combination NATO filter cartridge 280 will have airborne contaminant particles removed by means of the HEPA filter, while the activated carbon material then removes vapor and gas contaminants by means of adsorption. Thus, such a combination NATO filter cartridge can treat both harmful airborne contaminant particles and vapor and gas components contained within ambient air before it is delivered to respirator 16 to be breathed by the wearer of the respirator.

Figure 22:
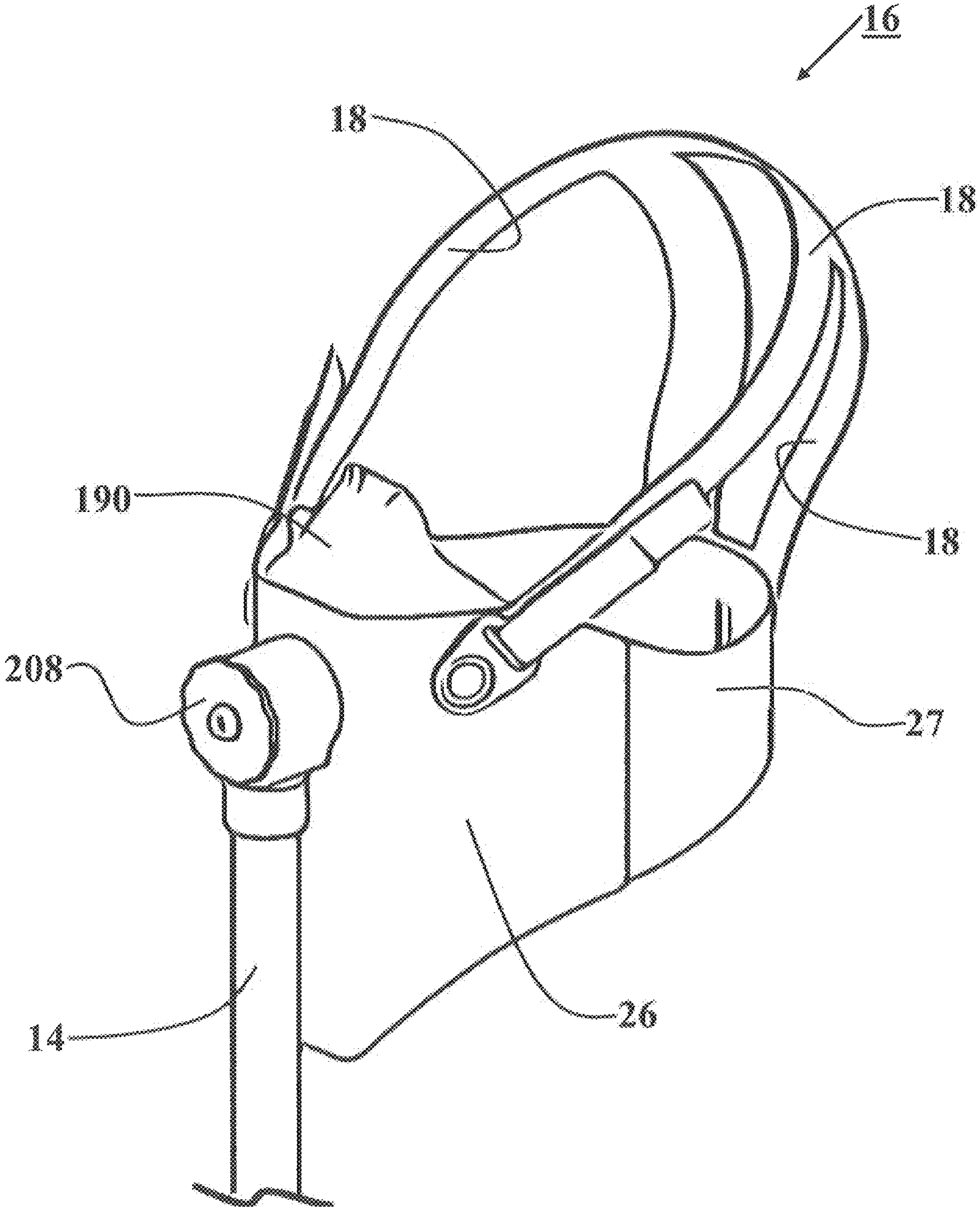
FIG. 22 is a perspective view of the respirator mask, flexible connector hose, and gaiter of the two-way protective respirator system of the present invention, showing the exterior of the respirator.
Figure 23:
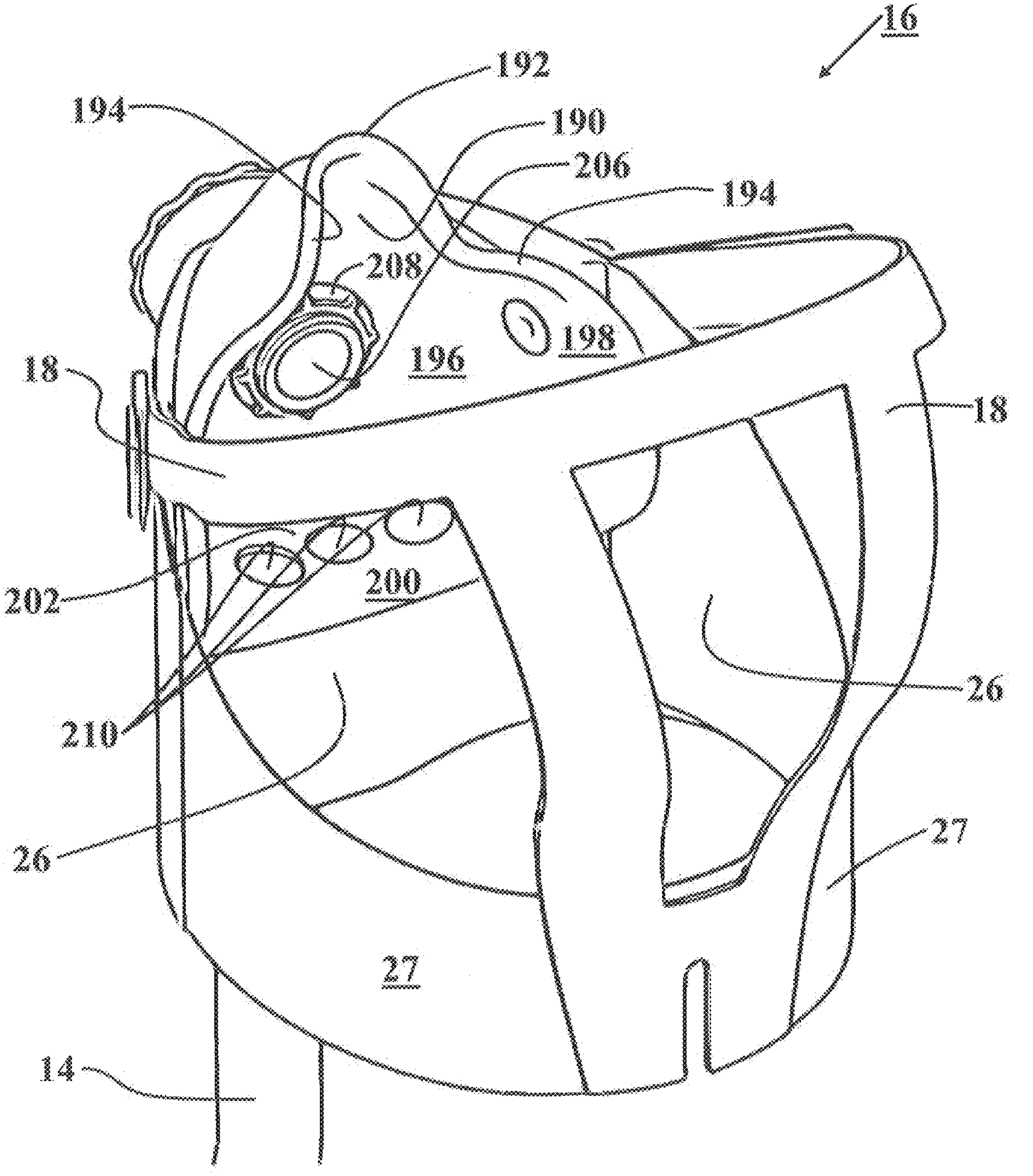
FIG. 23 is perspective view of the respirator mask, flexible connector hose, and gaiter of the two-way protective respirator system, showing the interior of the respirtator.
Figure 24:
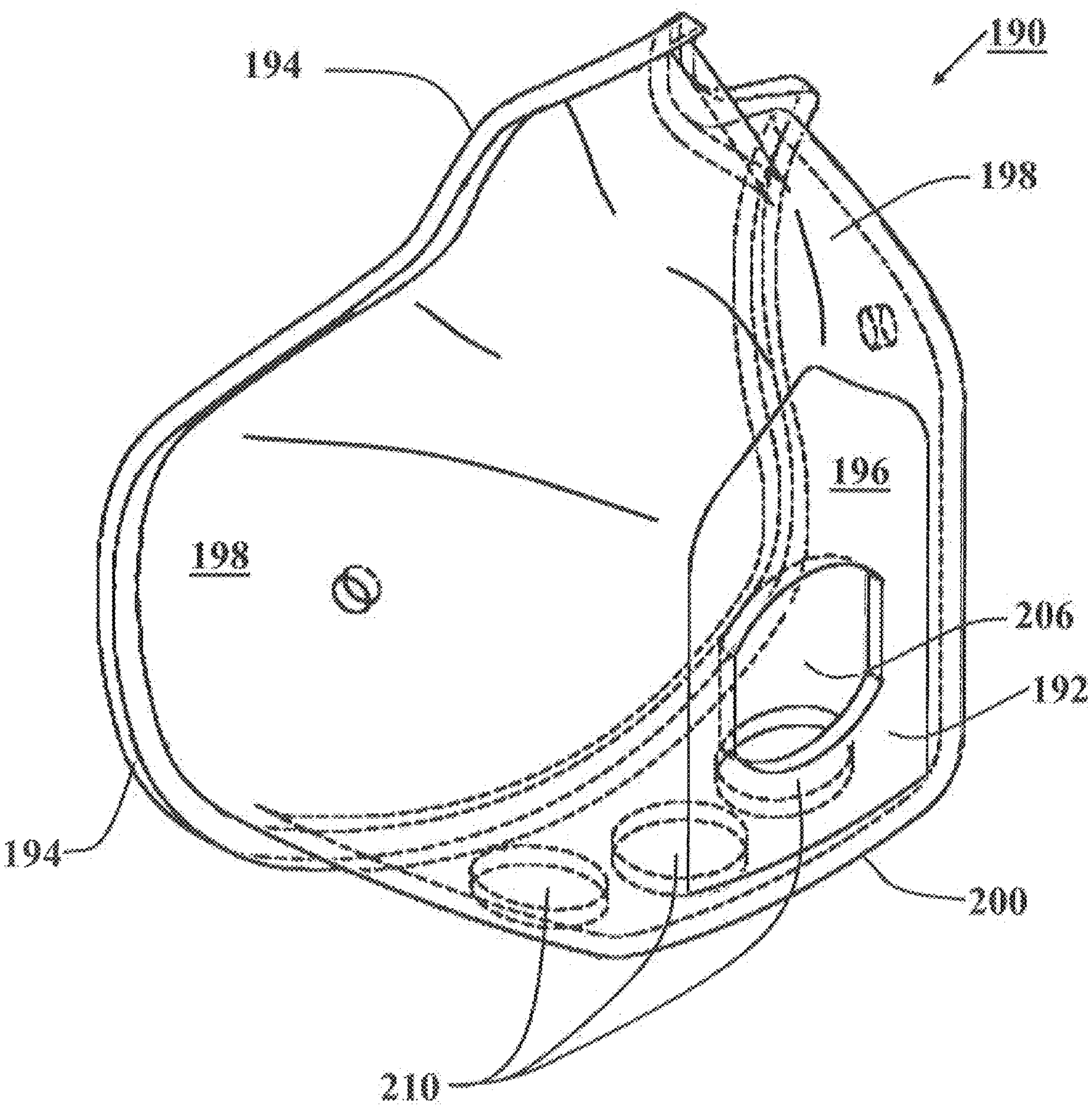
FIG. 24 is a frontal perspective view of the respirator mask.

The respirator 16 portion of the two-way protective respirator system 10 is depicted in greater detail in FIGS. 22-23. As shown in FIG. 23, it comprises respirator mask 190 featuring a shell 192 having a peripheral edge 194 around the circumference of the respirator mask that is properly shaped to the face of the wearer. In this way, the respirator mask 190 may be worn over the nose and mouth of the wearer, while preventing ambient air from leaking through the gap between the mask and face that is commonplace for prior art surgical masks. Such leakage would cause the wearer to breath in any viral, bacterial, or other airborne contaminant particles contained in the ambient air that would defeat the purpose of the two-way protective respirator system.

The shell 192 portion of the respirator mask 190 may be made from separate front, side, and bottom panels, but it is preferably continuously shaped. The resulting three-dimensional structure provided by such front portion 196, side portions 198, and bottom portion 200 defines a chamber 202 referred to herein as the "first chamber." This chamber has an open back side for accommodating the wearer's face. Straps or harness 18 attached to the side portions 198 of the respirator mask 190 secure the respirator mask in place with respect to the head of the wearer.

Located in the front portion 196 of the respirator mask 190 is an inlet hole 206. A fitting 208 may be secured to this inlet hole 206 which is then attached to flexible hose 14 that in turn is secured to outlet pipe 42 of cooling blower fan unit 40 (see FIG. 5). In this manner, the incoming ambient air that is filtered by air intake blower fan unit 40 is delivered at a slightly elevated pressure of about 1.5-3 inches of water, preferably about 2 inches of water through flexible hose 14 through inlet hole 206 into first chamber 202 of respirator mask 190. The approximately 4 cfm of incoming air velocity is maintained above a zero value during the wearer's inhalation. This incoming processed air stream may be easily breathed by the wearer through his nose and mouth, while being protected from the viral, bacterial, and other harmful airborne contaminant particles and vapor/gas components contained in the ambient air that were entrapped by the filter media 160 or 252 contained inside the air intake blower fan unit 40.

The nose cup shell 192 of respirator mask 190 should be produced from a non-permeable material like 70-90 durometer silicone elastomer. 80 Shore A elastomer is preferred. It is important that the nose cup shell be sufficiently elastomerically flexible, so that the peripheral edge 194 of the shell adheres closely to the contour of the face of the wearer to prevent leakage of unfiltered exhaled air escaping from the respirator mask 190 to the environment. Otherwise, the people in the surrounding community would be subject to breathing in the very viruses and bacteria that the two-way protective respirator system 10 of the present invention is designed to prevent.

The volume of this first chamber 202 contained inside respirator mask 190 should be about 5-10 $in^3$, preferably about 7 $in^3$. Such an interior volume will accommodate an adequate supply of filtered air for the wearer of the mask 190 to breath.

Thus, the respirator mask 190 of the present invention is different from prior art products available in the industry in that it does not contain one or two filter units directly attached to the respirator for filtering contaminant particles from the incoming air after it enters the mask. Instead, the filtration process occurs before the airstream enters the first chamber 202 inside respirator mask 190. Moreover, the continuous supply of fresh air into the respirator 16 will flush out high humidity and temperature conditions accumulated in the first chamber 202 caused by exhalation, thereby improving the comfort for the wearer who may have the respirator mask 190 secured to his face for a prolonged period of time.

Flexible, corrugated CPAP hose 14 that delivers the filtered airflow from cooling blower fan unit 40 to first chamber 202 contained inside respirator mask 190 should be made from a suitably flexible material like polyvinyl chloride ("PVC") to accommodate the movement of the wearer's body. It should be about 24-60 inches in length, preferably about 36 inches. It should also be about 0.5-1.5 inches ID in diameter, preferably about 0.8 inches ID. Such an appropriately sized flexible connector hose 14 will ensure that the airstream delivered by cooling blower fan unit 40 to first chamber 202 contained inside respirator mask 190 exhibits an average velocity of about 4 cfm for easy breathing by the wearer.

The bottom portion 200 of respirator mask 190 features at least one outlet hole 210, preferably a plurality of outlet holes of at least three. Such outlet holes permit air exhaled by the wearer's mouth to readily exit first chamber 202 inside the respirator mask 190. This represents a departure from the standard N95 respirator used in the medical profession for which the wearer must exhale air through the N95 mask material which limits proper respiratory function, or the air is expelled directly through an exhalation valve mounted in the N95 respirator without diffusion filtering. After a few hours, tight-fitting N95 respirators have been found to reduce the amount of available oxygen by up to 20% for the wearer. The non-woven fabric material forming the body of the N95 respirator that blocks viral particles simultaneously restricts the inflow of ambient air containing oxygen necessary for breathing along with exhaled air that therefore builds up inside the N95 respirator.

Figure 25:
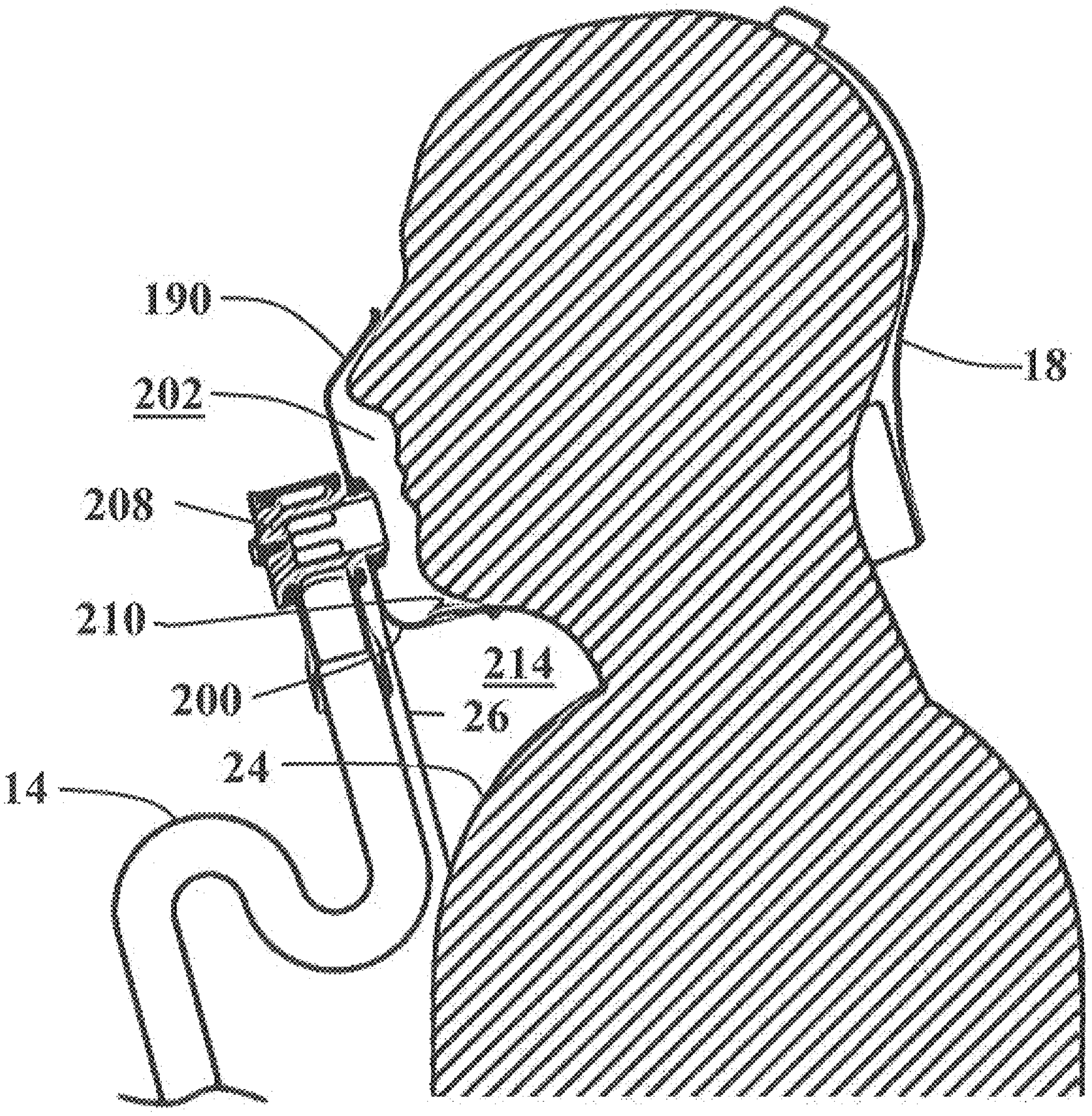
FIG. 25 is a schematic view of a person wearing the respirator and gaiter portions of the two-way protective respirator system of the present invention.

The outlet holes 210 contained within the bottom portion 200 of the respirator mask 190 of the present invention allows the exhaled air to enter a second "chamber" 214 defined by the bottom surface 200 of the respirator mask 190, the gaiter 26 of the two-way protective mask system 10, and the wearer's chest 24 (see FIG. 25). Gaiter 26 should be produced from two to three layers of high-thread count, fine-weave cotton or cotton/polyester blend fabric. Exemplary materials for gaiter 26 include broad cloth cotton, poplin, linen, flannel, tea towel, and sweatshirt fabric. The threads of this woven fabric should be characterized by about 200-600 threads per inch ("TPI"), preferable about 600 TPI. While too loose of a fabric weave will prevent the resulting apertures between the woven threads from filtering out the airborne contaminant particles, too tight of a fabric weave will cause a backup of exhaled air within second chamber 214, reduced respiratory function, and unwanted leakage of the air between respiratory mask 190 and gaiter 26 and the wearer's face and chest.

Second chamber 214 should have a volume of about 50-100 $in^3$, preferably about 75 $in^3$. A surface area for gaiter 26 of about 25-150 $in^2$, preferably about 80-100 $in^2$, should be capable of producing this volume for second chamber 214. It is important that the volume of second chamber 214 is sufficiently greater than the volume of first chamber 202, so that the velocity of the airflow contained inside the first chamber decreases as it enters the second chamber 214 due to the increased volume of the second chamber with respect to the volume of the first chamber. This reduced velocity of the air flow exhaled by the wearer into the second chamber 214 will cause the natural resistance of the fabric of gaiter 26 to cause the gaiter to lie against the chest of the wearer to produce a relatively air-tight seal of the edges of the gaiter against the wearer's chest. Such a seal will cause the exhaled air to exit second chamber 214 through the apertures between the woven threads of the fabric for gaiter 26, instead of between the gaiter and the wearer's chest, in order to filter out larger airborne contaminant particles contained within the exhaled air. At the same time, the reduced velocity of the exhaled airflow contained inside second chamber 214 will allow the submicron virus particles contained in the exhaled air to cling to the neighboring fibers of the woven fabric of the gaiter 26 to be separated from the exhaled air exiting the second chamber by means of a diffusion separation mechanism. This lower exhaled air velocity inside second chamber 214 will increase the efficiency of this diffusion separation.

Gaiter 26 may also include an elastic fabric back portion 27 that attaches it to head straps or harness 18 that surrounds the wearer's head (see FIG. 23). The forces exerted by these elastic fabric panels 27 help to pull the gaiter 26 against the wearer's chest to produce the necessary air-tight seal.

The inlet orifice 206 formed within shell 192 of respirator mask 190 should be about 0.5-1 inch in diameter. The larger, the better for facilitating incoming filtered airflow. Meanwhile, the outlet orifices 210 should preferably be three in number at about 0.6 inches in diameter each. By restricting the size of these outlet orifices, a slight back pressure condition is created inside first chamber 202 inside the respirator mask to keep the cooled and filtered airflow entering the first chamber separate from the moist, warmer air exhaled by the wearer into the second chamber. This will improve the physical comfort of the wearer who can therefore wear the respirator mask 190 and utilize the two-way protective respirator system 10 of the present invention for a longer time period.

While the number and size diameter of outlet apertures 210 in respirator mask 190 are important for creating the necessary slight back pressure condition in the first chamber to separate the warmer and moister exhaled air contained in the second chamber from the "fresh" incoming filtered airstream entering the first chamber, there are times when a back flow of air from the second chamber to the first chamber is desirable. First, a person undergoing physical exercises or other exertion will need more than 4 cfm of filtered air in the nose cone region of respirator mask 190. Prior art mask devices like surgical masks will allow the person undergoing heavy breathing to draw ambient air through the gaps between the mask and the face to satisfy this extra demand. However, such ambient airstream drawn through the gaps will not be filtered of harmful airborne contaminants. The resulting exposure to such harmful airborne particles and vapor components would defeat the purpose of the two-way protective respirator system 10 of the present invention.

Second, as the filter media 168, 252 contained inside the air intake blower fan unit 120 becomes overloaded with entrapped airborne particles and vapor components, it will impede a desirable flow of filtered air through the filter media to the respirator mask 190. Such a reduced airflow may no longer meet the needs of a person at rest, and particularly a person undergoing strenuous exertion.

Third, as the stored energy contained in battery pack 80 is reduced due to operation of the air intake blower fan unit 120, less filtered and conditioned airstream will be delivered to the respirator mask 190.

But due to the novel design of the two-way protective respirator system 10 of the present invention that contains two separate air chambers, this problem is readily overcome. The second chamber defined by gaiter 26 and the wearer's chest is closely adjacent to the first chamber defined by the respirator mask 190 and the wearer's face. Only the bottom surface 200 of the respirator mask 190 separates the two chambers. Outlet apertures 210 allow for open communication between the air volume contained inside the two chambers. Thus, a person undergoing heavy exertion or otherwise needing an extra volume of incoming filtered airflow in the first chamber will breathe more deeply, thereby drawing a portion of the exhaled air contained inside the second chamber back through outlet apertures 210 to produce the necessary extra volume of air inside the first chamber for the person wearing the respirator mask 190 to breathe.

While this volume of air drawn from the second chamber back into the first chamber may not be as fresh as the incoming airflow delivered by the air intake blower fan unit 120 to the first chamber, it is still breathable. It is also better than the wearer trying to draw unfiltered ambient air into the respirator mask 190's first chamber via any gaps between the respirator mask and the wearer's face. Moreover, any airborne contaminant particles or vapor components contained inside the second chamber that are drawn back into the first chamber will have been personally exhaled by the wearer, so they represent no new danger to the wearer.

Furthermore, the wearer is likely to sense the existence of stale air in the first chamber. This will notify the wearer of the fact that the filter media contained inside the air intake blower fan unit 120 may need to be replaced, or to check whether battery pack 80 needs to be replaced or recharged.

This feature that allows air contained inside the second chamber to be drawn back into the first chamber for breathing helps to mitigate the potentially adverse effect of a tight-fitting respirator mask. At the same time, because the availability of this back drafted air from the second chamber to the first chamber will reduce any drawing of ambient air through any gaps into the first chamber, there is less of a need for very tightly fitting the respirator mask to the wearer's face. This is particularly helpful for persons with facial hair. Standard N95 respirator masks prohibit facial hair that can impede a tight seal between the respirator mask and the person's face.

In another embodiment of the two-way protective respirator system 10 of the present invention, the air intake blower fan unit 40 may be adapted to additionally treat the temperature and humidity levels of the incoming airstream. This may entail a small, portable thermoelectric cooler/heater unit. Such a unit should operate off of the electrical supply provided by battery 80. It should preferably be capable of cooling the filtered incoming airflow by up to 20° F., and heating the incoming airflow by up to 60° F. The thermoelectric-cooler/heater unit may be adjustable so that the wearer can define how much deviation he wants to produce from ambient temperate conditions. By cooling the temperature and removing any resulting condensed water in the airflow, the humidity level of that airflow may simultaneously be adjusted by the wearer for additional comfort.

Once the incoming ambient air is drawn by the fan unit and passed through the filter media to remove harmful airborne particulates and vapor components, the resulting airstream is then passed through the thermoelectric-cooler/heater unit to adjust the temperature and humidity accordingly. Such temperature and humidity-controlled air stream will be more comfortable for inhalation when it is delivered to the respirator 16, 190.

The above specification and accompanying drawings provide a complete description of the structure, components, and operation of the two-way protective respirator system of the present invention. Since many embodiments of the invention can be made without departing from the spirit and scope of the invention, the invention resides in the claims hereinafter appended.

I claim:

1. A two-way protective respirator system for removing harmful airborne contaminant particles and vapor components from ambient air breathed by a person wearing the respirator and biologic virus, bacteria, and other pathogen particles from air exhaled by the person from the respirator and emitted to persons within a group setting within the surrounding community, the two-way protective respirator system configured to communicate with a source of ambient air comprising:

a respirator worn over the nose and mouth of the person and defining a first chamber, the respirator fitting closely to the face of the person to reduce leakage of ambient air into or out of the first chamber between the person's face and the respirator, the respirator having an inlet orifice and an outlet orifice;

a blower fan for drawing the ambient air into a hose connected to the inlet orifice of the respirator to produce a first airflow stream under a positive pressure condition for delivery to the first chamber of the respirator;

a filter unit operatively connected to the blower fan for removing harmful airborne contaminant particles or vapor components contained within the ambient air from the first airflow stream before it is delivered to the first chamber of the respirator;

a gaiter made from woven fabric extending from the respirator and having lateral edges that lie against the chest of the person, a second chamber defined by the gaiter fabric and the person's chest;

wherein the filter unit removes harmful airborne contaminant particles or vapor components contained within the ambient air that is delivered as the first airflow stream to the first chamber to protect the person breathing in the first airflow stream contained in the first chamber; and wherein an exhaled second airflow stream emitted by the person into the first chamber flows out through the outlet orifice of the respirator into the second chamber defined by the gaiter and the person's chest, submicron biologic virus, bacteria, and other pathogen particles contained within the exhaled second airflow stream clinging to neighboring fibers of the woven fabric of the gaiter to remove them by a diffusion separation mechanism before the resulting sanitized exhaled airflow stream exiting the gaiter enters the surrounding community to protect persons within the group setting from exposure to the virus, bacteria, and other pathogen contaminant particles.

2. The two-way protective respirator system of claim 1, wherein the volume of the second chamber is larger than the volume of the first chamber, so that the velocity of the airflow stream decreases as it travels from the first chamber to the second chamber to cause the lateral edges of the gaiter to lie against the chest of the person to produce a seal for the second chamber.

3. The two-way protective respirator system of claim 1, wherein the respirator is made from a solid shell of non-permeable material.

4. The two-way protective respirator system of claim 1, wherein the blower fan is a centrifugal blower fan.

5. The two-way protective respirator system of claim 1, wherein the first airflow stream produced by the blower fan is at about 13-40 cfm.

6. The two-way protective respirator system of claim 1, wherein the first airflow stream upon delivery to the respirator first chamber is at about 3-10 cfm.

7. The two-way protective respirator system of claim 1, wherein the filter unit comprises mechanical, physical, electrostatic, or lightwave means to remove the harmful airborne contaminant particles from the incoming ambient air.

8. The two-way protective respirator system of claim 7, wherein the filter unit comprises a HEPA filter.

9. The two-way protective respirator system of claim 7, wherein the filter unit comprises a ultraviolet light.

10. The two-way protective respirator system of claim 1, wherein the filter unit comprises activated carbon material for removing the harmful vapor components from the incoming ambient air.

11. The two-way protective respirator system of claim 10, wherein the filter unit comprises a NATO filter cartridge.

12. The two-way protective respirator system of claim 1, wherein the volume of the first chamber is about 5-10 $in^3$.

13. The two-way protective respirator system of claim 1, wherein the volume of the second chamber is about 50-100 $in^3$.

14. The two-way protective respirator system of claim 1, wherein the surface area of the gaiter is about 25-150 $in^2$.

15. The two-way protective respirator system of claim 1, wherein the gaiter is made from high-thread count, finely woven fabric having about 200-600 threads per inch ("TPI").

16. The two-way protective respirator system of claim 15, wherein the gaiter comprises two or more layers of the high-thread count, finely woven about 200-600 TPI fabric.

17. The two-way protective respirator system of claim 1, wherein the diameter of the outlet orifice of the mask is restricted to about 0.6 inches to create a slight back pressure condition inside the first chamber to keep the first airflow stream entering the first chamber separate from the moist, warmer exhaled second airflow stream exiting through the outlet orifice into the second chamber.

18. The two-way protective respirator system of claim 1, wherein if a person requires more than about 4 cfm of filtered air in the first airflow stream delivered to the first chamber of the respirator for proper breathing, the increased breathing of the person draws the volume of the exhaled second airflow stream contained in the second chamber back through the outlet orifice of the respirator into the first chamber to supplement the first airflow stream contained inside the first chamber for breathing by the person.

19. The two-way protective respirator system of claim 18, wherein ambient air is not drawn by the person's increased breathing level through gaps existing between the respirator and the person's face into the first chamber to expose the person to harmful airborne contaminant particles and vapor components contained in the ambient air.

20. The two-way protective respirator system of claim 1, wherein the temperature of the first airflow stream delivered to the first chamber of the respirator is reduced to make it more comfortable for the person to breathe.

21. The two-way protective respirator system of claim 1, wherein the humidity of the first airflow delivered to the first chamber of the respirator is controlled to make it more comfortable for the person to breathe.

* * * * *